(12) United States Patent
Schissler et al.

(10) Patent No.: US 9,977,644 B2
(45) Date of Patent: May 22, 2018

(54) METHODS, SYSTEMS, AND COMPUTER READABLE MEDIA FOR CONDUCTING INTERACTIVE SOUND PROPAGATION AND RENDERING FOR A PLURALITY OF SOUND SOURCES IN A VIRTUAL ENVIRONMENT SCENE

(71) Applicant: The University of North Carolina at Chapel Hill, Chapel Hill, NC (US)

(72) Inventors: Carl Henry Schissler, Carrboro, NC (US); Dinesh Manocha, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 185 days.

(21) Appl. No.: 14/812,785

(22) Filed: Jul. 29, 2015

(65) Prior Publication Data

US 2016/0034248 A1 Feb. 4, 2016

Related U.S. Application Data

(60) Provisional application No. 62/030,393, filed on Jul. 29, 2014.

(51) Int. Cl.
*G06F 3/16* (2006.01)
*H04R 27/00* (2006.01)
*H04S 7/00* (2006.01)

(52) U.S. Cl.
CPC ............. *G06F 3/165* (2013.01); *H04R 27/00* (2013.01); *G10H 2210/136* (2013.01);
(Continued)

(58) Field of Classification Search
CPC ..... G06F 3/165; G06F 17/5009; H04R 27/00; G10K 11/04; A63F 13/60;
(Continued)

(56) References Cited

U.S. PATENT DOCUMENTS 4,908,837 A * 3/1990 Mori .................. H04B 1/70712
375/151
5,467,401 A * 11/1995 Nagamitsu ............... G09B 9/22
381/17
(Continued)

FOREIGN PATENT DOCUMENTS

WO WO 2013/184215 A2 12/2013

OTHER PUBLICATIONS

Notice of Allowance and Fee(s) Due for U.S. Appl. No. 13/373,901 (dated May 28, 2014).
(Continued)

*Primary Examiner* — Oyesola C Ojo
(74) *Attorney, Agent, or Firm* — Jenkins, Wilson, Taylor & Hunt, P.A.

(57) ABSTRACT

Methods, systems, and computer readable media for conducting interactive sound propagation and rending for a plurality of sound sources in a virtual environment scene are disclosed. According to one method, the method includes decomposing a virtual environment scene containing a plurality of sound sources into a plurality of partitions and forming a plurality of source group clusters, wherein each of the source group clusters includes two or more of the sound sources located within a common partition. The method further includes determining, for each of the source group clusters, a single set of sound propagation paths relative to a listener position and generating a simulated output sound at a listener position using sound intensities associated with the determined sets of sound propagation paths.

14 Claims, 12 Drawing Sheets

(52) U.S. Cl.
CPC .......... *G10H 2210/305* (2013.01); *H04S 7/30* (2013.01); *H04S 7/302* (2013.01); *H04S 7/305* (2013.01); *H04S 2400/15* (2013.01); *H04S 2420/07* (2013.01)

(58) Field of Classification Search
CPC ............. A63F 2300/6081; A63F 13/54; H04S 2420/07; H04S 2400/15; H04S 7/305; H04S 7/302; H04S 7/30; G10H 2210/305; G10H 2210/136
See application file for complete search history.

(56) References Cited

U.S. PATENT DOCUMENTS

| | | | |
|---|---|---|---|
| 5,771,041 A * | 6/1998 | Small | H04S 1/007 715/727 |
| 6,259,452 B1 | 7/2001 | Coorg et al. | |
| 6,751,322 B1 * | 6/2004 | Carlbom | H04S 3/00 381/61 |
| 7,027,600 B1 | 4/2006 | Kaji et al. | |
| 7,319,760 B2 | 1/2008 | Sekine et al. | |
| 7,394,904 B2 | 7/2008 | Bruno et al. | |
| 7,463,740 B2 | 12/2008 | Kushida | |
| 7,480,386 B2 | 1/2009 | Ogata | |
| 7,809,453 B2 | 10/2010 | Reichelt et al. | |
| 7,930,048 B2 | 4/2011 | Reichelt et al. | |
| 8,029,363 B2 | 10/2011 | Radek et al. | |
| 8,133,117 B2 | 3/2012 | Ueda et al. | |
| 8,214,179 B2 | 7/2012 | Carlbom et al. | |
| 8,249,283 B2 | 8/2012 | Ando et al. | |
| 8,466,363 B2 | 6/2013 | Tsuchida | |
| 8,615,090 B2 | 12/2013 | Son et al. | |
| 8,634,578 B2 | 1/2014 | Vickers | |
| 8,847,965 B2 | 9/2014 | Chandak et al. | |
| 8,958,567 B2 | 2/2015 | Tsingos et al. | |
| 8,995,675 B2 | 3/2015 | Chandak et al. | |
| 9,113,280 B2 | 8/2015 | Cho et al. | |
| 9,189,915 B2 | 11/2015 | Timperley | |
| 9,711,126 B2 | 7/2017 | Mehra et al. | |
| 2001/0043738 A1 | 11/2001 | Sawhney et al. | |
| 2003/0052875 A1 | 3/2003 | Salomie | |
| 2005/0281410 A1 * | 12/2005 | Grosvenor | H04H 60/04 381/61 |
| 2006/0116781 A1 | 6/2006 | Blesser | |
| 2006/0126878 A1 * | 6/2006 | Takumai | H04R 3/12 381/335 |
| 2006/0247918 A1 * | 11/2006 | Schmidt | H04S 7/302 704/200 |
| 2006/0290695 A1 | 12/2006 | Salomie | |
| 2007/0036432 A1 | 2/2007 | Xu et al. | |
| 2008/0037796 A1 * | 2/2008 | Jot | H04S 1/005 381/17 |
| 2008/0232602 A1 * | 9/2008 | Shearer | H04S 7/302 381/17 |
| 2008/0240448 A1 * | 10/2008 | Gustafsson | H04S 7/30 381/17 |
| 2008/0249750 A1 | 10/2008 | Mao | |
| 2009/0046864 A1 * | 2/2009 | Mahabub | H04S 7/30 381/17 |
| 2009/0262604 A1 | 10/2009 | Funada | |
| 2010/0142733 A1 * | 6/2010 | Choi | H04R 3/12 381/300 |
| 2010/0208905 A1 * | 8/2010 | Franck | H04S 3/008 381/59 |
| 2011/0017545 A1 | 1/2011 | Pompei | |
| 2011/0081023 A1 | 4/2011 | Raghuvanshi et al. | |
| 2011/0222372 A1 * | 9/2011 | O'Donovan | G01S 3/8083 367/103 |
| 2011/0249825 A1 | 10/2011 | Ise | |
| 2012/0007940 A1 | 1/2012 | Michrowski et al. | |
| 2012/0016640 A1 | 1/2012 | Murphy | |
| 2012/0101609 A1 * | 4/2012 | Supper | H04S 3/002 700/94 |
| 2012/0249556 A1 | 10/2012 | Chandak et al. | |
| 2012/0269355 A1 | 10/2012 | Chandak et al. | |
| 2012/0288114 A1 | 11/2012 | Duraiswami et al. | |
| 2012/0307880 A1 * | 12/2012 | Horbach | H04L 25/03057 375/230 |
| 2013/0002672 A1 | 1/2013 | Peterson et al. | |
| 2013/0207976 A1 | 8/2013 | Jenkins | |
| 2013/0282388 A1 * | 10/2013 | Engdegard | G10H 1/0008 704/500 |
| 2014/0025386 A1 | 1/2014 | Xiang et al. | |
| 2014/0161268 A1 | 6/2014 | Antani et al. | |
| 2015/0057083 A1 | 2/2015 | Mehra et al. | |
| 2015/0294041 A1 | 10/2015 | Yeh et al. | |
| 2015/0332680 A1 * | 11/2015 | Crockett | G10L 19/008 381/23 |
| 2015/0378019 A1 | 12/2015 | Schissler et al. | |

OTHER PUBLICATIONS

Final Office Action for U.S. Appl. No. 13/373,901 (dated Jan. 14, 2014).
Non-Final Office Action for U.S. Appl. No. 13/373,901 (dated Sep. 11, 2013).
Abramowitz et al, "Handbook of Mathematical Functions," 5th ed. Dover, New York (1964).
Akenine-Moller et al., "Conservative and Tiled Rasterization Using a Modified Triangle Setup," Journal of Graphics Tools, vol. 10, No. 3, pp. 1-7 (2005).
Alarcao, et al., "An auralization system for real time room acoustics simulation," Proceedings of Tecniacustica, (2009).
Allen, et al., "Image method for efficiently simulating small-room acoustics," The Journal of the Acoustical Society of America, vol. 65, Issue 4 (April), pp. 943-950, (1979).
Antani, et al., "Aural proxies and directionally-varying reverberation for interactive sound propagation in virtual environments," Visualization and Computer Graphics, IEEE Transactions, vol. 19, Issue 4, pp. 218-233, (2013).
Antani, et al., "Efficient finite-edge diffraction using conservative from-region visibility," Applied Acoustics, vol. 73, pp. 218-233, (2012).
Antani et al., "Direct-to-Indirect Acoustic Radiance Transfer," IEEE Transactions on Visualization and Computer Graphics, vol. 18, No. 2, pp. 261-269 (Feb. 2012).
Antani et al., "Interactive Sound Propagation Using Compact Acoustic Transfer Operators," ACM Transactions on Graphics, vol. 31, No. 1, Article 7, pp. 7:1-7:12 (Jan. 2012).
Antonacci et al., "Fast Modeling of Acoustic Reflections and Diffraction in Complex Environments Using Visibility Diagrams," Proceedings of 12th European Signal Processing Conference, pp. 1773-1776 (2004).
Aretz, "Combined Wave and Ray Based Room Acoustic Simulations of Small Rooms: Challenges and limitations on the way to realistic simulation results," Ph.D. Thesis, Aachener Beiträge zur Technischen Akustik (Sep. 2012).
Arfken, George B. and Weber, Hans J., "Essential Mathematical Methods for Physicists," (1985).
Arvo et al., "A Survey of Ray Tracing Acceleration Techniques," An Introduction to Ray Tracing, pp. 201-262 (1989).
Barbone et al., "Scattering by a hybrid asymptotic/finite element method," Computer Methods in Applied Mechanics and Engineering, vol. 164, No. 1, pp. 141-156 (1998).
Battenberg et al., "Implementing Real-Time Partitioned Convolution Algorithms on Conventional Operating Systems," Proceedings of the 14th International Conference on Digital Audio Effects, Paris, France (2011).
Begault, "3-D Sound for Virtual Reality and Multimedia," NASA/TM-2000-000000, pp. 1-246 (Apr. 2000).
Ben-Artzi et al., "A Precomputed Polynomial Representation for Interactive BRDF Editing with Global Illumination," ACM Transactions on Graphics, pp. 1-10 (2008).
Bertram, et al., "Phonon tracing for auralization and visualization of sound," Proceedings of IEEE Visualization, pp. 151-158, (2005).

(56) References Cited

OTHER PUBLICATIONS

Biot et al., "Formulation of Wave Propagation in Infinite Media by Normal Coordinates with an Application to Diffraction," The Journal of the Acoustical Society of America, vol. 29, No. 3, pp. 381-391 (Mar. 1957).
Bittner et al., "Adaptive Global Visibilty Sampling," SIGGRAPH '09: ACM SIGGRAPH, pp. 1-10 (2009).
Bittner et al., "Fast Exact From-Region Visibility in Urban Scenes," Eurographics Symposium on Rendering, pp. 1-9 (2005).
Bittner et al., "Hierarchical Visibility Culling with Occlusion Trees," Proceedings of Computer Graphics International, pp. 207-219 (Jun. 1998).
Bittner et al., "Visibility in Computer Graphics," Environment and Planning B: Planning and Design, vol. 30, pp. 729-756 (2003).
Blauert, "Spatial Hearing: The Psychophysics of Human Sound Localization," MIT Press, pp. 334-335 (1983).
Borish, J., "Extension to the image model to arbitrary poly-hedra," The Journal of the Acoustical Society of America, vol. 75, Issue 6 (June), pp. 1827-1836, (1984).
Calamia et al., "Edge Subdivision for Fast Diffraction Calculations," 2005 IEEE Workshop on Applications of Signal Processing to Audio and Acoustics, pp. 187-190 (2005).
Calamia et al., "Fast Time-Domain Edge-Diffraction Calculations for Interactive Acoustic Simulations," EURASIP Journal on Advances in Signal Processing, vol. 2007, Article 63560, pp. 1-33 (2007).
Calamia et al., "Integration of edge diffraction calculations and geometrical-acoustics modeling," Proceedings of Forum Acusticum, pp. 1-6 (2005).
Case, K, "Structural Acoustics: a General Form of Reciprocity Principles in Acoustics," Technology Reports, JSR-92-193, The MITRE Corporation (Jan. 1993).
Chambers et al., "Time-domain experiments on the diffraction of sound by a step discontinuity," Journal of the Acoustical Society of America, vol. 96, No. 3, pp. 1887-1892 (Sep. 1994).
Chandak et al., "AD-Frustum: Adaptive Frustum Tracing for Interactive Sound Propagation," IEEE Transactions on Visualization and Computer Graphics, vol. 14, No. 6, pp. 1707-1714 (Nov./Dec. 2008).
Chandak, et al.,"FastV: From-point visibility culling on complex models," Computer Graphics Forum (Proc. of EGSR), vol. 28, Issue 3, pp. 1237-1247, (2009).
Cheng et al., "Heritage and Early History of the Boundary Element Method," Engineering Analysis with Boundary Elements, vol. 29, No. 3, pp. 268-302 (Mar. 2005).
Chhugani et al., "vLOD: High-Fidelity Walkthrough of Large Virtual Environments," IEEE Transactions on Visualization and Computer Graphics, vol. 11, No. 1, pp. 35-47 (Jan./Feb. 2005).
Christensen et al., Odeon Manual, Chapter 6 (2013).
Christensen et al., "A New Scattering Method that Combines Roughness and Diffraction Effects," Forum Acousticum, Budapest, Hungary (2005).
Christensen et al., "Danish Acoustical Society Round Robin on Room Acoustic Computer Modeling," Odeon A/S: Lyngby, Denmark (2008).
Cohen-Or et al., "A Survey of Visibility for Walkthrough Applications," IEEE Transactions on Visualization and Computer Graphics, vol. 9, No. 3, pp. 412-431 (Jul.-Sep. 2003).
Coorg et al., "Real-Time Occlusion Culling for Models with Large Occluders," Symposium on Interactive 3D Graphics, pp. 83-90 (Apr. 1997).
Dalenback, "Room acoustic prediction based on a unified tretment of diffuse and specular reflection," The Journal of the Acoustical Society of America, vol. 100, No. 2, Pt. 1, pp. 899-909 (Aug. 1996).
Dalenbäck et al., "A Macroscopic View of Diffuse Reflection," J. Audio Eng. Soc., vol. 42, No. 10, pp. 793-807 (Oct. 1994).
Doicu et al, "Acoustic and Electromagnetic Scattering Analysis Using Discrete Sources," 1st ed. Academic Press (Jul. 2000).
Duguet et al., "Robust Epsilon Visibility," Proc. of ACM SIGGRAPH, pp. 567-575 (2002).
Durand et al., "Conservative Visibility Preprocessing Using Extended Projections," SIGGRAPH '00: Proceedings of the 27th Annual Conference on Computer Graphics and Interactive Techniques, pp. 1-13 (2000).
Durand, "3D Visibility: Analytical Study and Applications," pp. 1-305 (1999).
Durand et al., "The 3d visibility complex: a new approach to the problems of accurate visibility," Proceedings of the Eurographics Workshop on Rendering Techniques '96, pp. 245-256 (1996).
Durand et al., "The Visibility Skeleton: A Powerful and Efficient Multi-Purpose Global Visibility Tool," SIGGRAPH '97: Proceedings of the 24th Annual Conference on Computer Graphics and Interactive Techniques, pp. 89-100 (1997).
Economou, et al., "The significance of sound diffraction effects in predicting acoustics in ancient theatres," Acta Acustica united with Acustica, vol. 99, Issue 1, pp. 48-57, (2013).
Embrechts, et al., "Broad spectrum diffusion model for room acoustics ray-tracing algorithms," The Journal of the Acoustical Society of America, vol. 107, Issue 4, pp. 2068-2081, (2000).
Eyring, C. F, "Reverberation time in "dead" rooms," The Journal of the Acoustical Society of America, vol. 1, Issue 2A (January), pp. 217-241, (1930).
Fairweather et al., "The Method of Fundamental Solutions for Scattering and Radiation Problems," Engineering Analysis with Boundary Elements, vol. 27, No. 7, pp. 759-769 (Jul. 2003).
Fouad et al.,"Perceptually Based Scheduling Algorithms for Real-Time Synthesis of Complex Sonic Environments," Proceedings of International Conference on Auditory Display (1997).
Franzoni, et al., "An acoustic boundary element method based on energy and intensity variables for prediction of high-frequency broadband sound fields," The Journal of the Acoustical Society of America, vol. 110, Article 3071, (2001).
Funkhouser, et al., "A beam tracing approach to acoustic modeling for interactive virtual environments," Proceedings of ACM SIGGRAPH, pp. 21-32, (1998).
Funkhouser et al., "Survey of Methods for Modeling Sound Propagation in Interactive Virtual Environment Systems," Presence, pp. 1-53 (2004).
Funkhouser et al., "A beam tracing method for interactive architectural acoustics," Journal of Acoustical Society of America, vol. 115, No. 2, pp. 739-756 (Feb. 2004).
Gallo et al., "Efficient 3D Audio Processing on the GPU," ACM Workshop on General Purpose Computing on Graphics Processors (2004).
Garland, et al., "Surface simplification using quadric error metrics," Proceedings of the 24th annual conference on Computer graphics and interactive techniques, ACM Press/Addison-Wesley Publishing Company, pp. 209-216, (1997).
Geringer et al., "High School String Players Perception of Violin, Trumpet, and Voice Intonation," String Research Journal, vol. 3, pp. 81-96 (2012).
Ghali, "A Survey of Practical Object Space Visibility Algorithms," SIGGRAPH, pp. 1-14 (2001).
Gigus et al., "Efficiently Computing and Representing Aspect Graphs of Polyhedral Objects," IEEE Transactions on Pattern Analysis Machine Intelligence, vol. 13, No. 6, pp. 542-551 (Jun. 1991).
Griesinger, David, "The Importance of the Direct to Reverberant Ratio in the Perception of Distance, Localization, Clarity, and Envelopment," Audio Engineering Society Convention, vol. 126, Audio Engineering Society (2009).
Gumerov et al., "A Broadband Fast Multipole Accelerated Boundary Element Method for the 3D Helmholtz Equation," The Journal of the Acoustical Society of America, vol. 125, No. 1, pp. 1-46 (2008).
Hampel et al., "Coupling boundary elements to a raytracing procedure," International Journal for Numerical Methods in Engineering, vol. 73, No. 3, pp. 427-445 (2008).
Hasenfratz et al., "A Survey of Real-Time Soft Shadows Algorithms," Eurographics, vol. 22, No. 4, pp. 753-774 (2003).
Heckbert et al., "Beam Tracing Polygonal Objects," Proc. of ACM SIGGRAPH, pp. 1-23 (1984).

(56) References Cited

OTHER PUBLICATIONS

Herder, Jens, "Optimization of Sound Spatialization Resource Management Through Clustering," The Journal of Three Dimensional Images, 3D-Forum Society, vol. 13, pp. 59-65 (1999).
Huang, et al., "An accurate method for voxelizing polygon meshes," Volume Visualization, 1998. IEEE Symposium on, IEEE, pp. 119-126, (1998).
Hudson et al., "Accelerated Occlusion Culling using Shadow Frusta," Proc. of ACM Symposium on Computational Geometry, pp. 1-10 (1997).
James, et al., "Precomputed acoustic transfer: output-sensitive, accurate sound generation for geometrically complex vibration sources," Proceedings of ACM SIGGRAPH, pp. 987-995, (2006).
Jean et al., "Calculation of Tyre Noise Radiation with a Mixed Approach," Acta Acustica united with Acustica, vol. 94, No. 1, pp. 1-6 (2008).
Kajiya, "The Rendering Equation," Proc. of ACM SIGGRAPH, vol. 20, No. 4, pp. 143-150 (1986).
Kapralos et al., "Sonel Mapping: Acoustic Modeling Utilizing an Acoustic Version of Photon Mapping," IEEE International Workshop on Haptics Audio Visual Environments and their Applications, pp. 2-3 (2004).
Klosowski et al., "The Prioritized-Layered Projection Algorithm for Visible Set Estimation," IEEE Transactions on Visualization and Computer Graphics, vol. 6, No. 2, pp. 108-123 (Apr.-Jun. 2000).
Koltun et al., "Hardware-accelerated from-region visibility using a dual ray space," Proceedings of the 12th Eurographics Workshop on Rendering Techniques, pp. 205-216 (2001).
Koltun et al., "Virtual Occluders: An Efficient Intermediate PVS Representation," Eurographics Workshop on Rendering, pp. 1-12 (2000).
Koltun et al., "Selecting Effective Occluders for Visibility Culling," Eurographics , pp. 1-5 (2000).
Kouyoumjian, et al., "A uniform geometrical theory of diffraction for an edge in a perfectly conducting surface," Proceedings of the IEEE, vol. 62, Issue 11, pp. 1448-1461, (1974).
Krivanek, et al., "Practical Global Illumination with Irradiance Caching," ACM SIGGRAPH Course Notes, (2008).
Krokstad, et al., "Calculating the acoustical room response by the use of a ray tracing technique," Journal of Sound and Vibration, vol. 8, Issue 1 (July), pp. 118-125, (1968).
Kulp, Barry D., "Digital Equalization Using Fourier Transform Techniques," Audio Engineering Society Convention, vol. 85, Audio Engineering Society (1988).
Kuttruff, H, "Acoustics: An Introduction," Taylor and Francis, New York, (2007).
Kuttruff, H., "A simple iteration scheme for the computation of decay constants in enclosures with diffusely reflecting boundaries," The Journal of the Acoustical Society of America, vol. 98, Issue 1, pp. 288-293, (1995).
Laine et al., "Accelerated beam tracing algorithm," Applied Acoustics, No. 70, pp. 172-181 (2009).
Laine, "An Incremental Shaft Subdivision Algorithm for Computing Shadows and Visibility," Master's Thesis, Helsinki University of Technology (Mar. 29, 2006).
Lauterbach et al., "Adaptive sampling for frustum-based sound propagation in complex and dynamic environments," Proceedings of the 19th International Congress on Acoustics, pp. 1-6 (Sep. 2007).
Lauterbach et al., "Interactive Sound Rendering in Complex and Dynamic Scenes sing Frustum Tracing," IEEE Transactions on Visualization and Computer Graphics, vol. 13, No. 6, pp. 1672-1679 (Nov.-Dec. 2007).
Law et al., "Preprocessing Occlusion for Real-Time Selective Refinement," 1999 Symposium on Interactive 3D Graphics, pp. 47-53 (1999).
Lehnert, "Systematic Errors of the Ray-Tracing Algorithm," Applied Acoustics, vol. 38, pp. 207-221 (1993).
Lehtinen, "Time-domain Numerical Solution of the Wave Equation," pp. 1-17 (Feb. 6, 2003).
Lensch et al., "FastV: From-point Visibility Culling on Complex Models," Eurographics Symposium on Rendering, vol. 28, No. 4, pp. 1-8 (2009).
Lentz, et al., "Virtual reality system with integrated sound field simulation and reproduction," EURASIP Journal on Advances in Signal Processing Jan. 2007, pp. 187-187, (2007).
Leyvand et al., "Ray Space Factorization for From-Region Visibility," ACM Transactions on Graphics, pp. 595-604 (Jul. 2003).
Liu et al, "Development of the Fast Multipole Boundary Element Method for Acoustic Wave Problems," Recent Advances in Boundary Element Methods, pp. 287-303 (2009).
Lloyd et al., "Warping and Partitioning for Low Error Shadow Maps," Proceedings of the Eurographics Symposium on Rendering, pp. 1-13 (2006).
Lokki et al., "Studies of Epidaurus with a Hybrid Room Acoustics Modelling Method," In The Acoustics of Ancient Theatres Conference, Greece, pp. 1-6 (Sep. 2011).
Lorensen, et al., "Marching cubes: A high resolution 3d surface construction algorithm," ACM Siggraph Computer Graphics, vol. 21, ACM, pp. 163-169, (1987).
Luebke et al., "Portals and Mirrors: Simple, Fast Evaluation of Potentially Visibile Sets," ACM Interactive 3D Graphics Conference, pp. 105-108 (1995).
Mattausch et al., "CHC++: Coherent Hierarchical Culling Revisited," Proc. of Eurographics Workshop on Rendering, vol. 27, No. 3, pp. 221-230 (2008).
Medwin et al., "Impulse studies of double diffraction: A discrete Huygens interpretation," The Journal of the Acoustical Society of America, pp. 1005-1013 (Sep. 1982).
Mehra, et al., "Wave-based sound propagation in large open scenes using an equivalent source formulation," ACM Transactions on Graphics, vol. 32, Issue 2, pp. 19:1-19:13, (2013).
Moeck, et al., "Progressive perceptual audio rendering of complex scenes," Proceedings of Symposium on Interactive 3D graphics and games, ACM, pp. 189-196, (2007).
Müller-Tomfelde, Christian, "Time-Varying Filter in Non-Uniform Block Convolution," Proceedings of the COST G-6 Conference on Digital Audio Effects (2001).
Murphy et al., "Hybrid Room Impulse Response Synthesis in Digital Waveguide Mesh Based Room Acoustics Simulation," In Proceedings of the 11th International Conference on Digital Audio Effects (DAFx-08), pp. 1-8 (Sep. 2008).
Navazo et al., "ShieldTester: Cell-to-cell visibility test for surface occluders," Proc. of Eurographics, pp. 291-302 (2003).
Nirenstein et al., "Exact From-Region Visibility Culling," Thirteenth Eurographics Workshop on Rendering, pp. 191-202 (2002).
Nirenstein et al., "Hardware Accelerated Visibility Preprocessing using Adaptive Sampling," Eurographics Symposium on Rendering (2004).
Nirenstein, "Fast and Accurate Visibility Preprocessing," Dissertation, University of Cape Town, South Africa (2003).
Nironen, H, "Diffuse Reflections in Room Acoustics Modelling," PhD thesis, Helsinki University of Technology, (2004).
Nooruddin, el at., "Simplification and repair of polygonal models uing volumetric techniques," Visualization and Computer Graphics, IEEE Transactions, vol. 9, Issue 2, pp. 191-205, (2003).
Notification of Transmittal of the International Search Report and the Written Opinion of the International Searching Authority, or the Declaration for International Application No. PCT/US2013/031619 (dated Dec. 24, 2013).
"Nvidia occlusion query," http://oss.sgi.com/projects/ogl-sample/registry/NV/occlusion_query.txt (2002).
Overbeck et al., "A Real-time Beam Tracer with Application to Exact Soft Shadows," Eurographics Symposium on Rendering, pp. 85-98 (Jun. 2007).
Owens et al., "A Survey of General-Purpose Computation on Graphics Hardware," Computer Graphics Forum, vol. 26, No. 1, pp. 80-113 (2007).
Pelzer, et al., "Frequency-and time-dependent geometry for real-time auralizations," Proceedings of 20th International Congress on Acoustics, ICA, (2010).

(56) References Cited

OTHER PUBLICATIONS

Pierce, "Acoustics: An Introduction to its Physical Principles and Applications," The Journal of the Acoustical Society of America, vol. 70(5), p. 1548 (1981).
Pulkki et al, "Implementation and visualization of edge diffraction with image source method," In Proceedings of the 112th AES Convention, pp. 1-13 (May 10-13, 2002).
Pulkki et al., "Visualization of edge diffraction," Acoustics Research Letters Online, vol. 4, No. 4, pp. 118-123 (2002).
Raghuvanshi et al., "Accelerated Wave-Based Acoustics Simulation," SPM '08: Proceedings of the 2008 ACM Symposium on Solid and Physical Modeling, pp. 91-102 (2008).
Raghuvanshi et al., "Efficient and Accurate Sound Propagation Using Adaptive Rectangular Decomposition," IEEE Transactions on Visualization and Computer Graphics, vol. 15, No. 5, pp. 789-801 (2009).
Raghuvanshi, et al., "Precomputed wave simulation for real-time sound propagation of dynamic sources in complex scenes," ACM Transactions on Graphics, vol. 29, Issue 4, pp. 68:1-68:11, (2010).
Reshetov et al., "Multi-Level Ray Tracing Algorithm," ACM Trans. Graph., pp. 1176-1185 (2005).
Rindel, et al., "Room Acoustic Simulation and Auralization—How Close can we get to the Real Room?," Proceedings of 8th Western Pacific Acoustics Conference, Melbourne (2003).
Savioja, et al., "Auralization Applying the Parametric Room Acoustic Modeling Technique—The Diva Auralization System," 8th International Conference on Auditory Display, pp. 219-224, (2002).
Savioja, L, "Real-Time 3D Finite-Difference Time-Domain Simulation of Mid-Frequency Room Acoustics," 13th International Conference on Digital Audio Effects, DAFx-10, (2010).
Schaufler et al., "Conservative Volumetric Visibility with Occluder Fusion," SIGGRAPH 2000, Computer Graphics Proceedings, pp. 229-238 (2000).
Schissler, et al., "Gsound: Interactive sound propagation for games," AES 41st International Conference: Audio for Games, (2011).
Schissler et al., "High-Order Diffraction and Diffuse Reflections for Interactive Sound Propagation in Large Environments," ACM Transactions on Graphics (SIGGRAPH 2014), vol. 33, Issue 4, Article 39 (2014).
Schröder, Dirk, "Physically Based Real-Time Auralization of Interactive Virtual Environments", vol. 11, Logos Verlag Berlin GmbH (2011).
Schroder et al., "Real-Time Hybrid Simulation Method Including Edge Diffraction," Proc. of the EAA Symposium on Auralization, pp. 1-6 (Jun. 15-17, 2009).
Schröder et al., "Real-Time Processing of Image Sources Using Binary Space Partitioning," Journal of the Audio Engineering Society, vol. 54, No. 7/8, pp. 604-619 (Jul./Aug. 2006).
Schroeder, M.R., "Natural sounding artificial reverberation," Journal of the Audio Engineering Society, vol. 10, Issue 3, pp. 19-223, (1962).
Shirley et al., "State of the Art in Interactive Ray Tracing," SIGGRAPH Course Notes (2006).
Shoemake, "Pluecker Coordinate Tutorial," Ray Tracing News 11 (1998).
Siltanen et al., "Frequency Domain Acoustic Radiance Transfer for Real-Time Auralization," Acta Acustica United with Acustica, vol. 95, pp. 106-117 (2009).
Siltanen, et al., "The Room Acoustic Rendering Equation," The Journal of the Acoustical Society of America, vol. 122, No. 3, pp. 1624-1635 (2007).
Siltanen, et al., "Geometry reduction in room acoustics modeling," Acta Acustica united with Acustica, vol. 94, Issue 3, pp. 410-418, (2008).
Svensson et al., "Edge-Diffraction Impulse Responses Near Specular-Zone and Shadow-Zone Boundaries," Acta Acustica United with Acustica, vol. 92, pp. 501-512 (2006).
Svensson et al., "Computational Modelling and Simulation of Acoustic Spaces," AES 22nd International Conference on Virtual, Synthetic and Entertainment Audio, pp. 1-20 (2002).
Svensson, et al., "An analytic secondary source model of edge diffraction impulse responses," Acoustical Society of America Journal, vol. 106, Issue 5 (Nov.), pp. 2331-2344, (1999).
Svensson, "Edge Diffraction Toolbox," pp. 1-2 (1999).
Taflove et al, "Computational Electrodynamics: The Finite-Difference Time-Domain Method, Third Edition," 3rd ed. Artech House Publishers, London, UK and Boston, USA, ch. 1,4 (Jun. 2005).
Taylor, et al., "Guided multiview ray tracing for fast auralization," IEEE Transactions on Visualization and Computer Graphics, vol. 18, Issue 11 (November), pp. 1797-1810, (2012).
Taylor et al., "iSound: Interactive GPU-based Sound Auralization in Dynamic Scenes," Techincal Report TR 10-006, University of North Carolina at Chapel Hill, pp. 1-10 (2010).
Taylor et al., "Fast Edge-Diffraction for Sound Propagation in Complex Virtual Envirnoments," EAA Auralization Symposium, pp. 1-6 (Jun. 2009).
Taylor, et al., "Resound: interactive sound rendering for dynamic virtual environments," MM '09: Proceedings of the seventeen ACM international conference on Multimedia, ACM, pp. 271-280, (2009).
Teller et al., "Computing the Antipenumbra of an Area Light Source," SIGGRAPH '92: Proceedings of the 19th Annual Conference on Computer Graphics and Interactive Techniques, pp. 139-148 (1992).
Teller et al., "Visibility Preprocessing for Interactive Walkthroughs," SIGGRAPH Comput. Graph., pp. 61-70 (1991).
Teller, "Visibility Computations in Densely occluded Polyheral Environments," PhD thesis, CS Division, UC Berkeley (1992).
Theoharis et al., "The Magic of the Z-Buffer: A Survey," Proc. of 9th International Conference on Computer Graphics, Visualization and Computer Vision, WSCG (2001).
Thompson, L. L., "A review of finite-element methods for time-harmonic acoustics," Journal of the Acoustical Society of America, vol. 119, Issue 3 (March), pp. 1315-1330, (2006).
Torres et al., "Computation of edge diffraction for more accurate room acoustics auralization," The Journal of the Acoustical Society of America, pp. 600-610 (2001).
Tsingos, et al., "Instant sound scattering," Proceedings of the Eurographics Symposium on Rendering, pp. 111-120, (2007).
Tsingos, et al., "Modeling acoustics in virtual environments using the uniform theory of diffraction," SIGGRAPH 2001, Computer Graphics Proceedings, pp. 545-552, (2001).
Tsingos, et al., "Perceptual audio rendering of complex virtual environments," Tech. Rep. RR-4734, INRIA, REVES/INRIA Sophia-Antipolis, Feb. 2003.
Tsingos, Nicholas, "A Versatile Software Architecture for Virtual Audio Simulations," International Conference on Auditory Display (ICAD) (2001).
Tsingos, et al., "Pre-computing geometry-based reverberation effects for games," 35th AES Conference on Audio for Games, pp. 1-10, (2009).
Tsingos et al., "A General Model for the Simulation of Room Acoustics Based on Hierarchical Radiosity," ACM SIGGRAPH 97, pp. 1-2 (1997).
Valimaki et al., "Fifty Years of Artificial Reverberation," IEEE Transactions on Audio, Speech, and Language Processing, vol. 20, Issue 5, pp. 1421-1448, (2012).
Vorlander, M, "Simulation of the transient and steady-state sound propagation in rooms using a new combined ray-tracing/image-source algorithm," The Journal of the Acoustical Society of America, vol. 86, Issue 1, pp. 172-178, (1989).
Wald et al., "State of the Art in Ray Tracing Dynamic Scenes," Eurographics State of the Art Reports, pp. 1-28 (2007).
Wand, M, et al., "Multi-resolution sound rendering," SPBG'04 Symposium on Point-Based Graphics 2004, pp. 3-11, (2004).
Wang et al., "A Hybrid Technique Based on Combining Ray Tracing and FDTD Methods for Site-Specific Modeling of Indoor Radio Wave Propagation," IEEE Transactions on Antennas and Propagation, vol. 48, No. 5, pp. 743-754 (May 2000).

(56) References Cited

OTHER PUBLICATIONS

Wang, et al., "Interactions of Model Detail Level and Scattering Coefficients in Room Acoustic Computer Simulation," International Symposium on Room Acoustics: Design and Science (2004).
Waterman, "T-matrix methods in acoustic scattering," The Journal of the Acoustical Society of America, vol. 125, No. 1, pp. 42-51 (Jan. 2009).
Wefers et al., "Efficient Time-Varying FIR Filtering using Crossfading Implemented in the DFT Domain," Forum Acousticum, Krakow, Poland, European Acoustics Association (2014).
Wenzel et al., "A Software-Based System for Interactive Spatial Sound Synthesis," ICAD, 6th International Conference on Auditory Display, pp. 151-156 (2000).
Wonka et al., "Guided Visibility Sampling," SIGGRAPH '06: ACM SIGGRAPH 2006 Papers, pp. 494-502 (2006).
Wonka et al., "Visibility Preprocessing with Occluder Fusion for Urban Walkthroughs," pp. 1-12 (2000).
Yee, "Numerical Solution of Initial Boundary Value Problems Involving Maxwell's Equations in Isotropic Media," IEEE Transactions on Antennas and Propagation, vol. 14, No. 3, pp. 302-307 (May 1966).
Yeh, et al., "Wave-ray coupling for interactive sound propagation in large complex scenes," ACM Transactions on Graphics, vol. 32, Issue 6, pp. 165:1-165:11, (2013).
Yin et al., "Generating 3D Builing Models from Architectural Drawings: A Survey," IEEE Computer Society, pp. 20-30 (Jan./Feb. 2009).
Yoon et al., Real-Time Massive Model Rendering, Morgan and Claypool Publishers (2008).
Zienkiewicz et al., "The Finite Element Method for Fluid Dynamics," 6 ed. Butterworth-Heinemann (Jan. 2006).
Non-Final Office Action for U.S. Appl. No. 14/387,127 (dated Nov. 4, 2016).
Botteldooren, D. 1994. Acoustical finite-difference time-domain simulation in a quasi-Cartesian grid. The Journal of the Acoustical Society of America 95, 2313.
Calamia et al., "Diffraction culling for virtual-acoustic simulations," The Journal of the Acoustical Society of America, pp. 2586-2586 (2009).
Dross, et al., "A fast reverberation estimator for virtual environments," Audio Engineering Society 30th International Conference, pp. 99-108 (Mar. 2007).
Granier et al., "Experimental auralization of car audio installations," Journal of the Audio Engineering Society, vol. 44, No. 10, pp. 835-849 (Oct. 1996).
Kropp et al, "Application of the Time Domain Firmulation of the Method of Equivalent Sources to Radiation and Scattering Problems," Acta Acustica united with Acustica, vol. 81, No. 6, pp. 528-543 (1995).
Liu, "The PTSD Algorithm: A Time-Domain Method Combining the Pseudospectral Technique and Perfectly Matched Layers," The Journal of the Acoustical Society of America, vol. 101, No. 5, p. 3182 (1997).
Ochmann, "The Full-Fled Equations for Acoustic Radiation and Scattering," The Journal of the Acoustical Society of America, vol. 105, No. 5, pp. 2574-2584 (1999).
Ochmann, "The source simulation technique for acoustic radiation problems," Acta Acustica united with Acustica, vol. 81, No. 6, pp. 512-527 (1995).
Pavic, "A Technique for the Computation of Sound Radiation by Vibrating Bodies Using Substitute Sources," Acta Acustica united with Acustica, vol. 92, pp. 112-126 (2006).
Pulkki, Ville, "Virtual Sound Source Positioning using Vector Base Amplitude Panning," Journal of the Audio Engineering Society, vol. 45, Issue 6, pp. 456-466 (1997).
Sakamoto et al, "Numerical Analysis of Sound Propagation in Rooms Using the Finite Difference Time Domain Method," The Journal of the Acousitcal Society of America, vol. 120, No. 5, p. 3008 (2006).
Southern, et al., "Spatial room impulse responses with a hybrid modeling method," Audio Engineering Society Convention 130 (2011).
Non-Final Office Action for U.S. Appl. No. 14/329,251 (dated Mar. 14, 2017).
Notice of Allowance and Fee(s) Due for U.S. Appl. No. 14/387,127 (dated Mar. 13, 2017).
Applicant Initiated Interview Summary for U.S. Appl. No. 14/387,127 (dated Feb. 17, 2017).
Commonly-assigned, co-pending U.S. Appl. No. 15/435,243 for "Methods, Systems, and Computer Readable Media for Acoustic Classification and Optimization for Multi-Modal Rendering of Real-World Scenes," (Unpublished, filed Feb. 16, 2017).
Restriction and/or Election Requirement for U.S. Appl. No. 14/754,155 (dated Jan. 13, 2017).
Achanta et al., "SLIC Superpixels Compared to State-of-the-art Superpixel Methods," Journal of Latex Class Files, vol. 6, No. 1 pp. 1-8 (Dec. 2011).
Antani, Lakulish, "Acoustic Simulation," 55 pages, (Apr. 9, 2009).
Bao et al., "Understanding the 3d layout of a cluttered room from multiple images," in Applications of Computer Vision (WACV), 2014 IEEE Winter Conference on. IEEE, pp. 1-8 (2014).
Batlle et al., "Recent progress in coded structured light as a technique to solve the correspondence problem: a survey," Pattern recognition, vol. 31, No. 7, pp. 963-982, (1998).
Bell et al., "Material Recognition in the Wild with the Materials in Context Database," Computer Vision and Pattern Recognition (CVPR), pp. 3479-3487 (2015).
Branch et al., "Automatic hole-filling of triangular meshes using local radial basis function," in 3D Data Processing, Visualization, and Transmission, Third International Symposium on. IEEE, pp. 1-8 (2006).
Calamia et al., "Fast Time-Domain Edge-Diffraction Calculations for Interactive Acoustic Simulations," EURASIP Journal on Advances in Signal Processing, pp. 1-10 (Oct. 16, 2006).
Chen et al., "3D indoor scene modeling from rgb-d data: a survey," Computational Visual Media, vol. 1, No. 4, pp. 267-278, (2015).
Christensen et al., "Estimating absorption of materials to match room model against existing room using a genetic algorithm," in Forum Acusticum 2014, At Krakow, Poland, pp. 1-10 (2014).
Cimpoi et al., "Deep convolutional filter banks for texture recognition and segmentation," arXiv preprint arXiv:1411.6836, pp. 1-10 (2014).
Dou et al., "Exploring high-level plane primitives for indoor 3D reconstruction with a hand-held RGB-D camera," in Computer Vision—ACCV 2012 Workshops. Springer, pp. 94-108 (2013).
Foster, "Impulse response measurement using golay codes," in Acoustics, Speech, and Signal Processing, IEEE International Conference on ICASSP'86., vol. 11. IEEE, pp. 929-932 (1986).
Gumerov, et al., "A broadband fast multipole accelerated boundary element method for the three-dimensional Helmholtz equation," Journal of the Acoustical Society of America, vol. 125, Issue 1, pp. 191-205, (2009).
Härmä et al. "Augmented Reality Audio for Mobile and Wearable Appliances," Journal of the Audio Engineering Society, vol. 52, No. 6, pp. 618-639 (2004).
Hu et al., "Toward Robust Material Recognition for Everyday Objects." in BMVC, vol. 13, pp. 1-11 (2011).
ISO, "ISO 354, Acoustics—Measurement of sound absorption in a reverberation room." International Standards Organisation, 2nd Edition, No. 354, pp. 1-21 (2003).
Jia et al., "Caffe: Convolutional Architecture for Fast Feature Embedding," in Proceedings of the 22nd ACM International Conference on Multimedia, pp. 1-4 (2014).
Larsson et al., "Auditory-induced presence in mixed reality environments and related technology," in The Engineering of Mixed Reality Systems. Springer, pp. 1-23 (2010).
Liu et al., "Exploring features in a bayesian framework for material recognition," in Computer Vision and Pattern Recognition (CVPR), 2010 IEEE Conference, pp. 1-8 (2010).
Liu et al., "Rent3D: Floor-plan priors for monocular layout estimation," in Proceedings of the IEEE Conference on Computer Vision and Pattern Recognition, pp. 3413-3421 (2015).

(56) References Cited

OTHER PUBLICATIONS

Monks et al., "Audioptimization: Goal-Based Acoustic Design," Laboratory for Computer Science, Massachusetts Institute of Technology, 32 pages, (Sep. 1998).
Mückl et al., "Precomputing sound scattering for structured surfaces," in Proceedings of the 14th Eurographics Symposium on Parallel Graphics and Visualization, pp. 1-8 (2014).
Nava, "Inverse sound rendering: In-situ estimation of surface acoustic impedance for acoustic simulation and design of real indoor environments," Ph.D. dissertation, Graduate School of Information Science and Technology, University of Tokyo, pp. 1-111 (2007).
Newcombe et al., "KinectFusion: Real-time dense surface mapping and tracking," in Mixed and augmented reality (ISMAR), 2011 10th IEEE international symposium on. IEEE, pp. 1-10 (2011).
Pulkki, Spatial sound generation and perception by amplitude panning techniques. Helsinki University of Technology, Report 62, pp. 1-59 (2001).
Rindel et al., "Odeon, a design tool for noise control in indoor environments," in Proceedings of the International Conference Noise at work. Lille, pp. 1-9 (2007).
Saksela et al., "Optimization of absorption placement using geometrical acoustic models and least squares," The Journal of the Acoustical Society of America, vol. 137, No. 4, pp. EL274-EL280 (2015).
Savioja et al., "Creating Interactive Virtual Acoustic Environments," Journal of the Audio Engineering Society (JAES), vol. 47, Issue 9, pp. 675-705 (1999).
Scharstein et al., "High-accuracy stereo depth maps using structured light," in IEEE Computer Vision and Pattern Recognition., vol. 1. IEEE, pp. 195-202 (2003).
Seddeq, "Factors influencing acoustic performance of sound absorptive materials," Australian Journal of Basic and Applied Sciences, vol. 3, No. 4, pp. 4610-4617 (2009).
Sormann et al., "Watertight multi-view reconstruction based on volumetric graph-cuts," in Image analysis. Springer, pp. 393-402 (2007).
Szegedy et al., "Going Deeper with Convolutions," in the IEEE Conference on Computer Vision and Pattern Recognition (CVPR), pp. 1-9 (Jun. 2015).
Tsingos et al., "Perceptual Audio Rendering of Complex Virtual Environments,". ACM Transactions on Graphics, vol. 23, No. 3, pp. 249-258 (2004).
Wang et al., "A Hole-Filling Strategy for Reconstruction of Smooth Surfaces in Range Images," in XVI Brazilian Symposium on Computer Graphics and Image Processing, SIBGRAPI 2003, IEEE, pp. 1-9 (2003).
Non-Final Office Action for U.S. Appl. No. 15/435,243 (dated Jul. 19, 2017).
Non-Final Office Action for U.S. Appl. No. 14/754,155 (dated Jul. 6, 2017).
Cimpoi et al., "Deep filter banks for texture recognition and segmentation," pp. 1-9 (2015).

\* cited by examiner

| Scene | Scene Complexity | | Clustering | | Propagation | | | | | | Rendering | |
|---|---|---|---|---|---|---|---|---|---|---|---|---|
| | #Tris | #Sources | #Clusters | Time(ms) | #Specular | #Diffuse | #Diffraction | #Rays | Time(ms) | #Paths | #Doppler Paths | Time(ms) |
| Sibenik | 75273 | 18 | 14 | 0.02 | 10 | 50 | 3 | 1000 | 49.2 | 208,832 | 7 | 15.6 |
| Tradeshow | 174405 | 200 | 95 | 0.21 | 20 | 40 | 3 | 1000 | 68.5 | 210,072 | 11 | 17.2 |
| | | | | | 10 | 100 | | | 182.7 | 871,982 | 17 | 75.1 |
| | | | | | | | | | 422.0 | 2,014,278 | 18 | 90.5 |
| City | 206976 | 50 | 24 | 0.08 | 10 | 50 | 3 | 1000 | 47.2 | 27,711 | 125 | 4.5 |
| Elmia R.R. | 1047 | 2 | 2 | 0.0 | 2 | 100 | 3 | 1000 | 46.1 | 96,278 | 0 | 2.5 |

1200

FIG. 12

METHODS, SYSTEMS, AND COMPUTER READABLE MEDIA FOR CONDUCTING INTERACTIVE SOUND PROPAGATION AND RENDERING FOR A PLURALITY OF SOUND SOURCES IN A VIRTUAL ENVIRONMENT SCENE

PRIORITY CLAIM

This application claims the benefit of U.S. Provisional Patent Application Ser. No. 62/030,393, filed Jul. 29, 2014; the disclosure of which is incorporated herein by reference in its entirety.

GOVERNMENT INTEREST

This invention was made with government support under Grant No. H325J070007 awarded by the Department of Education. The government has certain rights in the invention.

TECHNICAL FIELD

The subject matter described herein relates to sound propagation within dynamic environments containing a plurality of sound sources. More specifically, the subject matter relates to methods, systems, and computer readable media for conducting interactive sound propagation and rending for a plurality of sound sources in a virtual environment scene.

BACKGROUND

The geometric and visual complexity of scenes used in video games and interactive virtual environments has increased considerably over the last few years. Recent advances in visual rendering and hardware technologies have made it possible to generate high-quality visuals at interactive rates on commodity graphics processing units (GPUs). This has motivated increased focus on other modalities, such as sound rendering, to improve the realism and immersion in virtual environments. However, it still remains a major challenge to generate realistic sound effects in complex scenes at interactive rates. The high aural complexity of these scenes is characterized by various factors, including a large number of sound sources. Namely, there can be many sound sources in these scenes, ranging from a few hundred to thousands. These sources may correspond to cars on the streets, crowds in a shopping mall or a stadium, or noise generated by machines on a factory floor. Similarly, other factors may include a large number of objects. Many of these scenes consist of hundreds of static and dynamic objects. Furthermore, these objects may correspond to large architectural models or outdoor scenes spanning over tens or hundreds of meters. In addition, another factor may consider acoustic effects. Notably, it is important to simulate various acoustic effects including early reflections, late reverberations, echoes, diffraction, scattering, and the like.

The high aural complexity results in computational challenges for sound propagation as well as for audio rendering. At a broad level, sound propagation methods can be classified into wave-based and geometric techniques. Wave-based methods, which numerically solve the acoustic wave equation, can accurately simulate all acoustic effects. However, these methods are limited to static scenes with few objects and are not yet practical for scenes with many sources. Geometric propagation techniques, based on ray theory, can be used to interactively compute early reflections (up to 5-10 orders) and diffraction in dynamic scenes with a few sources [Lentz et al. 2007; Pelzer and Vorländer 2010; Taylor et al. 2012; Schissler et al. 2014].

A key challenge is to simulate late reverberation (LR) at interactive rates in dynamic scenes. The LR corresponds to the sound reaching the listener after a large number of reflections with decaying amplitude and corresponds to the tail of the impulse response [Kuttruff 2007]. Perceptually, LR gives a sense of the environment's size and of its general sound absorption. Many real-world scenarios, including a concert hall, a forest, a city street, or a mountain range, have a distinctive reverberation [Valimaki et al. 2012]. But this essential aural element, LR, is computationally expensive. Notably, using ray tracing in a typical room-size environment, calculating only 1-2 seconds of LR length requires the calculation of high-order reflections (e.g. >50 bounces) in moderately-sized rooms.

The complexity of sound propagation algorithms increases linearly with the number of sources. This limits current interactive sound-propagation systems to only a handful of sources. Many techniques have been proposed in the literature to handle multiple sources: sound source clustering [Tsingos et al. 2004], multi-resolution methods [Wang et al. 2004], and a combination of hierarchical clustering and perceptual metrics [Moeck et al. 2007], etc. to handle a large number of sources. However, a major challenge is to combine them with sound propagation methods to generate realistic reverberation effects.

A third major challenge in generating realistic acoustic effects is realtime audio rendering for geometric sound propagation. A dense impulse response for a single source generated with high order reflections can contain tens of thousands of propagation paths; hundreds of sources can result in millions of paths. Current audio rendering algorithms are unable to deal with such complexity at interactive rates.

Accordingly, there exists a need for systems, methods, and computer readable media for conducting interactive sound propagation and rending for a plurality of sound sources in a virtual environment scene.

SUMMARY

Methods, systems, and computer readable media for conducting interactive sound propagation and rending for a plurality of sound sources in a virtual environment scene are disclosed. According to one method, the method includes decomposing a virtual environment scene containing a plurality of sound sources into a plurality of partitions and forming a plurality of source group clusters, wherein each of the source group clusters includes two or more of the sound sources located within a common partition. The method further includes determining, for each of the source group clusters, a single set of sound propagation paths relative to a listener position and generating a simulated output sound at a listener position using sound intensities associated with the determined sets of sound propagation paths.

A system for conducting interactive sound propagation and rending for a plurality of sound sources in a virtual environment scene is also disclosed. The system includes a processor and a scene decomposition module (SDM) executable by the processor, the SDM configured to decompose a virtual environment scene containing a plurality of sound sources into a plurality of partitions. The system further includes a sound source clustering (SSC) module executable by the processor, the SSC module configured to form a plurality of source group clusters, wherein each of the source group clusters includes two or more of the sound sources located within a common partition and determine, for each of the source group clusters, a single set of sound propagation paths relative to a listener position. The system also includes a hybrid convolution audio rendering (HCAR) module executable by the processor, the HCAR module configured to generate a simulated output sound at a listener position using sound intensities associated with the determined sets of sound propagation paths.

The subject matter described herein can be implemented in software in combination with hardware and/or firmware. For example, the subject matter described herein can be implemented in software executed by one or more processors. In one exemplary implementation, the subject matter described herein may be implemented using a non-transitory computer readable medium having stored thereon computer executable instructions that when executed by the processor of a computer control cause the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms "node" and "host" refer to a physical computing platform or device including one or more processors and memory.

As used herein, the terms "function" and "module" refer to software in combination with hardware and/or firmware for implementing features described herein.

BRIEF DESCRIPTION OF THE DRAWINGS

Preferred embodiments of the subject matter described herein will now be explained with reference to the accompanying drawings, wherein like reference numerals represent like parts, of which:

FIG. 12 is depicts a table highlighting the aural complexity of different virtual scenes according to an embodiment of the subject matter described herein.

DETAILED DESCRIPTION

Figure 1:
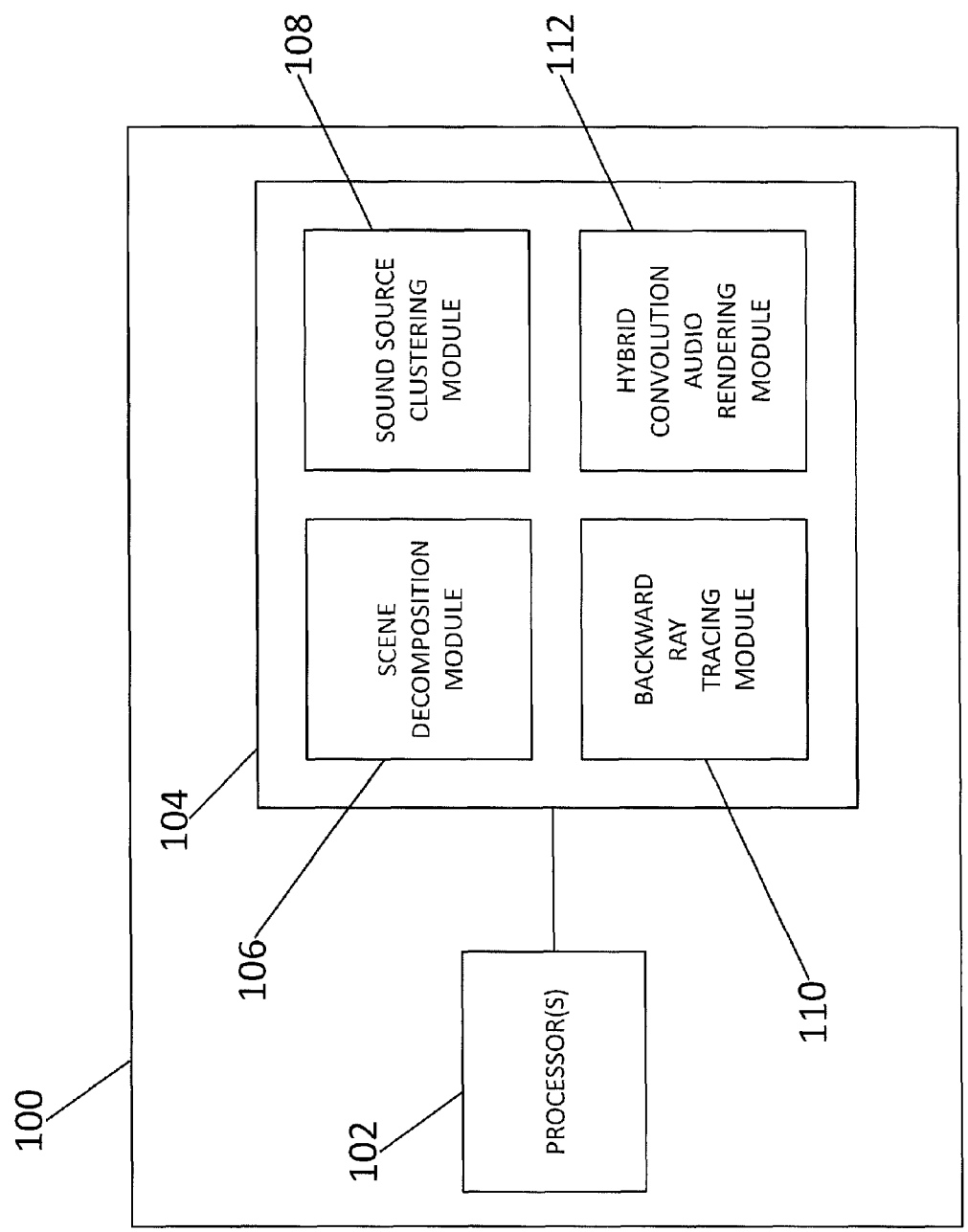
FIG. 1 is a diagram illustrating an exemplary node for conducting interactive sound propagation and rending for a plurality of sound sources in a virtual environment scene according to an embodiment of the subject matter described herein.

The subject matter described herein discloses methods, systems, and computer readable media for conducting interactive sound propagation and rending for a plurality of sound sources in a virtual environment scene. In some embodiments, the disclosed subject matter may be implemented using a backward sound propagation ray tracing technique, a sound source clustering algorithm for sound propagation, and/or a hybrid convolution rending algorithm that efficiently renders sound propagation audio. Notably, the presented sound source clustering approach may be utilized to computationally simplify the generation of sounds produced by a plurality of sound sources present in a virtual environment (e.g., applications pertaining to video games, virtual reality, training simulations, etc.). More specifically, the disclosed subject matter affords a technical advantage by utilizing a listener-based backward ray tracing technique with the clustering a large number of sound sources, which thereby enables the simulation of a complex acoustic scene to be conducted in a faster and more efficient manner. Additional description regarding this technique is disclosed below. Likewise, the tracing of sound rays from the listener to the source in a backward fashion as conducted by the disclosed subject matter affords a more efficient and accurate technique for considering rays. For example, the utilization of the described backward ray tracing technique may result in producing fewer and smaller errors as compared to forward sound propagation tracing methods. Additional description regarding this tracing technique is disclosed below.

With respect to the disclosed hybrid audio rendering technique for processing sound propagation in aurally-complex scenes, the present subject matter may also utilize a predefined Doppler shifting threshold in order to optimize processing. Namely, in order to render Doppler shifting effects for a large number of sound propagation paths, a rendering system may sort/categorize the sound propagation paths into two categories based on the amount of Doppler shifting that is exhibited by each path. In some embodiments, the hybrid convolution technique may be configured to switch between a fractional delay interpolation technique and a partitioned block convolution technique depending on a determined amount of Doppler shifting. For example, if the Doppler shifting amount exceeds a perceptual and/or predefined threshold value, the sound propagation path may be rendered in a way that supports Doppler shifting (e.g., use of fractionally-interpolated delay lines). Otherwise, an efficient partitioned convolution algorithm may be used to render the sound propagation path. Notably, the hybrid convolution technique presented allow for more efficient rendering of complex acoustic scenes that are characterized by Doppler shifting. Additional description regarding this technique is disclosed below.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a block diagram illustrating an exemplary node 101 (e.g., a single or multiple processing core computing device) for conducting interactive sound propagation and rending for a plurality of sound sources in a virtual environment scene according to an embodiment of the subject matter described herein. Node 101 may be any suitable entity, such as a special purpose computing device or platform, which can be configured to combine fast backward ray tracing from the listener with sound source clustering to compute propagation paths. In accordance with embodiments of the subject matter described herein, components, modules, and/or portions of node 101 may be implemented or distributed across multiple devices or computing platforms. For example, a cluster of nodes 101 may be used to perform various portions of a sound propagation, backward tracing, and/or rendering technique/application.

In some embodiments, node 101 may comprise a computing platform that includes one or more processors 102. In some embodiments, processor 102 may include a physical processor, a field-programmable gateway array (FPGA), an application-specific integrated circuit (ASIC) and/or any other like processor core. Processor 102 may include or access memory 104, such as for storing executable instructions. Node 101 may also include memory 104. Memory 104 may be any non-transitory computer readable medium and may be operative to communicate with one or more of processors 102. Memory 104 may include a scene decomposition module (SDM) 106, a sound source clustering (SSC) module 108, a backward ray tracing (BRT) module 110, and a hybrid convolution-base audio rendering (HCAR) module 112. In some embodiments, node 101 and its components and functionality described herein constitute a special purpose device that improves the technological field of sound propagation by providing a sound source clustering algorithm for sound propagation, a backward sound propagation ray tracing technique, and/or a hybrid convolution rending algorithm that efficiently renders sound propagation audio. In accordance with embodiments of the subject matter described herein, SDM 106 may be configured to cause processor(s) 102 to render a virtual environment scene into a dynamic octree comprising to a plurality of "leaf node" partitions. Such rendering is described below.

In some embodiments, SSC module 108 may be configured to use one or more geometric acoustic techniques for simulating sound propagation in one or more virtual environments. Geometric acoustic techniques typically solve the sound propagation problem by using assuming sound travels like rays. As such, geometric acoustic techniques may provide a sufficient approximation of sound propagation when the sound wave travels in free space or when the interacting objects are large compared to the wavelength of sound. Therefore, these methods are more suitable for small wavelength (high frequency) sound waves, where the wave effect is not significant. However, for large wavelengths (low frequencies), it remains challenging to accurately model the diffraction and higher order wave effects. Despite these limitations, geometric acoustic techniques are popular due to their computational efficiency, which enable them to handle very large scenes. Exemplary geometric acoustic techniques that may be used by modules 108-112 include methods based on stochastic ray tracing or image sources.

In accordance with embodiments of the subject matter described herein, SSC module 108 may be configured to form a plurality of source group clusters. In some embodiments, each of the source group clusters includes two or more of the sound sources located within a common partition (such as a common leaf node). In some embodiments, sound sources that are contained in a same leaf node of the octree are processed into clusters based on clustering criteria disclosed below. In addition, SSC module 108 may be configured to determine, for each of the source group clusters, a single set of sound propagation paths relative to a listener position. In some embodiments, SSC module 108 may also be configured to merge two or more source group clusters into a single merged source group cluster. In such instances, the sound propagation paths that are ultimately determined by the system may also include one or more sound propagation paths from a merged source group cluster.

As indicated above, memory 104 may further include BRT module 110. In some embodiments, BRT module 110 may be configured to compute high-order diffuse and specular reflections related to geometric sound propagation. For example, BRT module 110 may be configured to trace sound propagation rays backwards from a listener's position and intersect them with the sound sources in an attempt to determine the specular and diffuse reflections that exist within a virtual environment scene. By tracking rays in this manner, the disclosed subject matter may achieve better scaling with the number of sound sources than forward ray tracing, thereby allowing the system to compute high-order diffuse reverberation for complex scenes at interactive rates. Additional description regarding the backward ray tracing technique conducted and/or supported by BRT module 110 is disclosed below.

In some embodiments, memory 104 may also include HCAR module 112, which may be configured to generate a simulated output sound at a listener position using sound intensities associated with the determined sets of sound propagation paths. In addition, HCAR module 112 may be further configured to sort each of the sound propagation paths based on the amount of Doppler shifting exhibited by the sound propagation path. Specifically, the HCAR module may be configured to render a sound intensity using fractional delay line interpolation on a first group of the sound propagation paths that exhibits an amount of Doppler shifting that exceeds a predefined threshold. Likewise, HCAR module 112 may be configured to render a sound intensity using a partitioned block convolution algorithm on a second group of the sound propagation paths that exhibits an amount of Doppler shifting that fails to exceed the predefined threshold. Additional description regarding the hybrid convolution rendering process conducted and/or supported by HCAR module 112 is disclosed below.

In accordance with embodiments of the subject matter described herein, each of modules 106-110 may be configured to work in parallel with a plurality of processors (e.g., processors 102) and/or other nodes. For example, a plurality of processor cores may each be associated with a SSC module 108. Moreover, each processor core may perform processing associated with simulating sound propagation for a particular environment. In another embodiment, some nodes and/or processing cores may be utilized for precomputing (e.g., performing decomposition of a spatial domain or scene and generating transfer functions) and other nodes and/or processing cores may be utilized during run-time, e.g., to execute a sound propagation tracing application that utilizes precomputed values or functions.

It will be appreciated that FIG. 1 is for illustrative purposes and that various nodes, their locations, and/or their functions may be changed, altered, added, or removed. For example, some nodes and/or functions may be combined into a single entity. In a second example, a node and/or function may be located at or implemented by two or more nodes.

The subject matter described herein may be utilized for performing sound rendering or auditory displays which may augment graphical renderings and provide a user with an enhanced spatial sense of presence. For example, some of the driving applications of sound rendering include acoustic design of architectural models or outdoor scenes, walk-throughs of large computer aided design (CAD) models with sounds of machine parts or moving people, urban scenes with traffic, training systems, computer games, and the like.

The disclosed subject matter presents an approach to generate plausible acoustic effects at interactive rates in large dynamic environments containing many sound sources. In some embodiments, the formulation combines listener-based backward ray tracing with sound source clustering and hybrid audio rendering to handle complex scenes. For example, the disclosed subject matter presents a new algorithm for dynamic late reverberation that performs high-order ray tracing from the listener against spherical sound sources. Sub-linear scaling with the number of sources is achieved by clustering distant sound sources and taking relative visibility into account. Further, hybrid convolution-based audio rendering technique can be employed to process hundreds of thousands of sound paths at interactive rates. The disclosed subject matter demonstrates the performance on many indoor and outdoor scenes with up to 200 sound sources. In practice, the algorithm can compute over 50 reflection orders at interactive rates on a multi-core PC, and we observe a 5× speedup over prior geometric sound propagation algorithms.

The disclosed subject matter presents a novel approach to perform interactive sound propagation and rendering in large, dynamic scenes with many sources. The associated formulation is based on geometric acoustics and can address and overcome all three challenges described above. The underlying algorithm is based on backward ray tracing from the listener to various sources and is combined with sound source clustering and real-time audio rendering. Some of the novel components of the approach include i) acoustic reciprocity for spherical sources comprising backward ray-tracing from the listener that is utilized to compute higher-order reflections in dynamic scenes for spherical sound sources and observe 5× speedup over forward ray tracing algorithms, ii) the interactive source clustering in dynamic scenes via an algorithm for perceptually clustering distant sound sources based on their positions relative to the listener and relative source visibility (i.e, this is the first clustering approach that is applicable to both direct and propagated sound), and iii) hybrid convolution rendering including a hybrid approach to render large numbers of sound sources in real time with Doppler shifting by performing either delay interpolation or partitioned convolution based on a perceptual metric (i.e., this results in more than 5× improvement over prior Doppler-shift audio rendering algorithms).

In some embodiments, the system can be implemented on a 4-core PC, and its propagation and rendering performance scales linearly with the number of computing processor unit (CPU) cores. The system is applicable to large complex scenes and it can compute over 50 orders of specular or diffuse reflection for tens or hundreds of moving sources at interactive rates. In addition, the hybrid audio rendering algorithm can process hundreds of thousands of paths in real time.

Many wave-based and geometric propagation algorithms have been proposed for interactive sound propagation. The wave-based methods are more accurate, but their complexity increases significantly with the simulation frequency and the surface areas of the objects or the volume of the acoustic space. Many precomputation-based interactive algorithms have been proposed for wave-based sound propagation in static indoor and outdoor scenes [James et al. 2006; Tsingos et al. 2007; Raghuvanshi et al. 2010; Mehra et al. 2013; Yeh et al. 2013]. Most interactive sound propagation algorithms for large scenes with a high number of objects are based on geometric propagation. These include fast algorithms based on beam tracing [Funkhouser et al. 1998; Tsingo et al. 2001] and frustum tracing [Chandak et al. 2009] in static scenes. Recent advances in ray tracing have been used for interactive sound propagation in dynamic scenes [Lentz et al. 2007; Pelzer and Vorländer 2010; Taylor et al. 2012; Schissler et al. 2014] and exploit the parallel capabilities of commodity CPUs and GPUs. However, current algorithms are limited to computing early reflections. All these interactive propagation algorithms can only handle a few sources.

Previous methods for computing interactive LR can be placed in three general categories: artificial reverb, statistical methods, and geometric precomputation. Artificial reverberators are widely used in games and VR and make use of recursive filters to efficiently produce plausible LR [Schroeder 1962], or can use convolution with a room impulse response [Valimaki et al. 2012]. Games often use artist-specified reverb filters for each region within a virtual environment. However, this is not physically based and is time-consuming to specify. Moreover, these reverberators cannot accurately reproduce outdoor late reverberation because they are designed to model the decay of sound in rooms. Statistical techniques estimate the decay rate for an artificial reverberator from the early reflections [Taylor et al. 2009]. These methods are applicable to dynamic scenes but have some limitations. The use of room acoustic models may not work well for outdoor environments, and cannot produce complex acoustic phenomena like coupled rooms and directional reverberation. Methods based on geometric precomputation use high-order ray tracing or some other sound propagation technique to precompute impulse response filters at various locations in an environment. At runtime, the correct filter is chosen and convolved with the audio. These methods can produce plausible reverberation and are inexpensive to compute, but also require lots of memory to store many impulse responses. Frequency-domain compression techniques have been used to reduce the storage required [Tsingos 2009; Raghuvanshi et al. 2010]. Other methods are based on the acoustic rendering equation [Siltanen et al. 2007] and combine early-reflection ray tracing with acoustic transfer operators to compute reverberation [Antani et al. 2012]. However, precomputed techniques cannot handle the acoustic effect of dynamic objects (e.g. doors). This work aims to generate these reverberation effects in real time with similar accuracy.

Visual rendering of complex datasets based on model simplification, image-based simplification and visibility computations may be accelerated in some instance. [Yoon et al. 2008]. Some of the ideas from visual rendering have been extended or modified and applied to sound rendering. These include methods based on interactive ray tracing and pre-computed radiance transfer that are used for sound propagation. Level-of-detail techniques have also been used for acoustic simulation [Siltaned et al. 2008; Pelzer and Vorländer 2010; Tsingos et al. 2007; Schissler et al. 2014].

Various hierarchical and clustering techniques have been proposed to render such scenes. Current methods perform source clustering using clustering cones [Herder 1999], perceptual techniques [Tsingos et al. 2004], or multi-resolution methods [Wand and Straβer 2004]. Other algorithms are based on recursive clustering [Moeck et al. 2007], which classify sources into different clusters based on a dynamic budget. The use of perceptual sound masking has also been proposed to reduce the number sources that are to be rendered [Tsingos et al. 2004; Moeck et al. 2007]. These techniques are aimed at optimizing digital signal processing for audio rendering once all sound paths and sources have been computed, and therefore cannot be directly used to accelerate the computation of sound propagation paths from each source to the listener.

Most current interactive techniques to generate smooth audio in dynamic scenes are based on interpolation and windowing techniques [Savioja et al. 2002; Taylor et al. 2012; Tsingos 2001]. Other techniques use fractionally-interpolated delay lines to perform a direct convolution with the propagated paths [Savioja et al. 1999; Wenzal et al. 2000; Tsingos et al. 2004] or dynamic convolution [Kulp 1988]. Time-varying impulse responses are rendered using interpolation in the time domain [Müller-Tomfelde 2001], or efficient interpolation in the frequency domain [Wefers and Vorlander 2014] that can reduce the number of inverse FFTs required. Low-latency processing of hundreds of channels can be performed in real time on current hardware using non-uniform partitioned convolution [Battenberg and Avizienis 2011]. Fouad et al. [1997] present a level-of-detail audio rendering algorithm by processing every k-th sample in the time domain.

The disclosed subject matter presents algorithms for sound propagation and audio rendering in complex scenes. The sound propagation approach is based on Geometric Acoustics (GA) in the context of a homogeneous propagation medium. GA algorithms assume that the scene primitives are larger than the wavelength. In some embodiments, mesh simplification techniques may be used to increase the primitive size [Siltanen et al. 2008; Schissler et al. 2014]. Further, ray-tracing-based algorithms can be used to compute specular and diffuse reflections [Krokstad et al. 1968; Voländer 1989, Taylor et al. 2012] and approximate wave effects with higher-order edge diffraction based on the Uniform Theory of Diffraction (UTD) [Tsingos et al. 2001; Taylor et al. 2012, Schissler et al. 2014].

Figure 2:
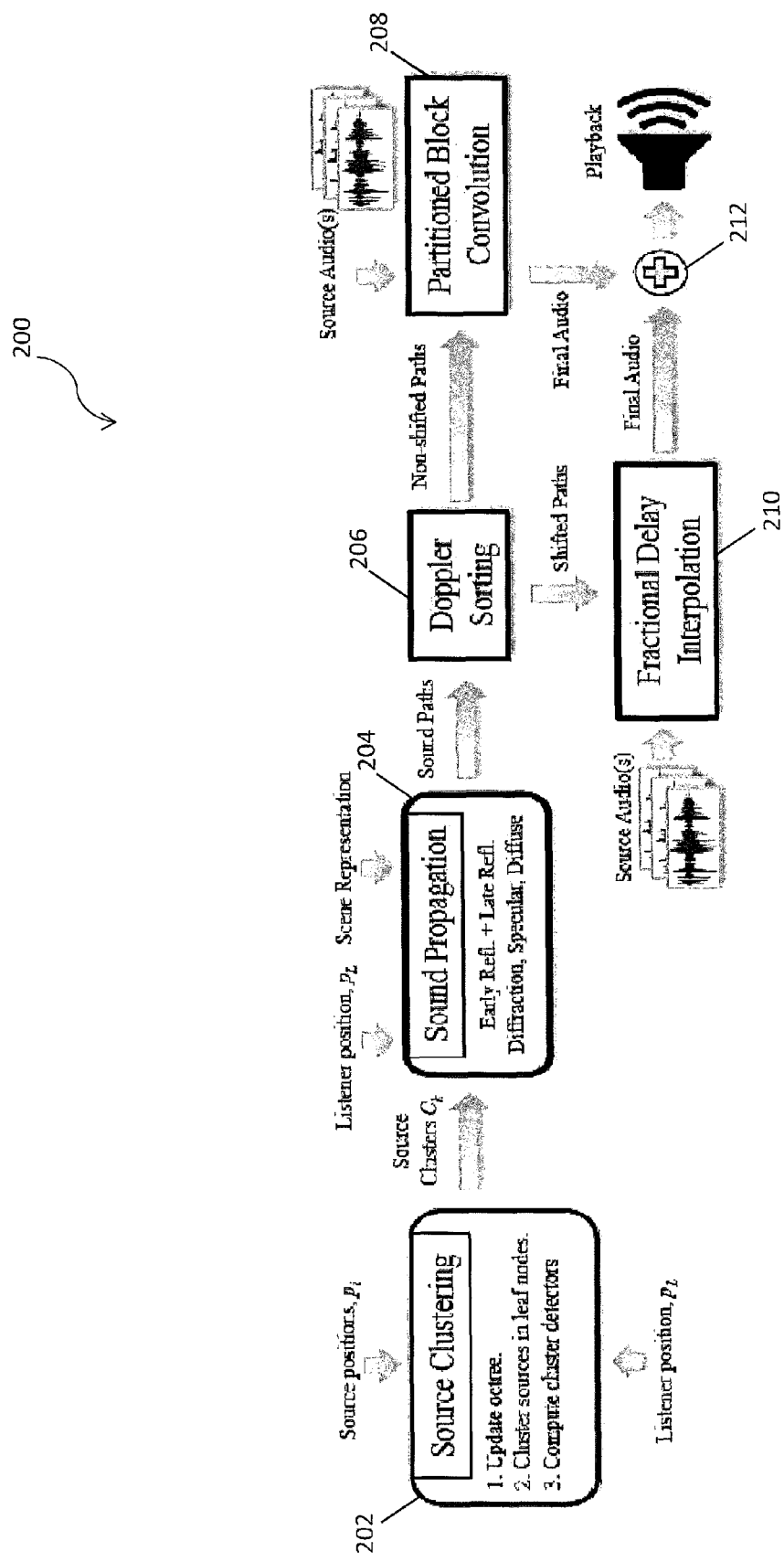
FIG. 2 is a diagram illustrating overview of sound propagation and auralization pipeline according to an embodiment of the subject matter described herein.

In order to handle scenes with high aural complexity, the disclosed subject matter presents new algorithms for interactive late reverberation in dynamic scenes using backward ray tracing, source clustering; sound propagation for clustered sources, and a hybrid convolution audio rendering algorithm for Doppler shifting. The overall pipeline is shown in FIG. 2, which illustrates an overview of sound propagation and auralization pipeline 200. On each propagation frame, the sound sources are merged into clusters (block 202), then sound propagation is performed from the listener's position, computing early and late reflections using backward ray tracing (block 204). The output paths are then sorted based on the amount of Doppler shifting (block 206). For example, output paths with significant shifting are rendering using fractional delay interpolation (block 210), while other paths are accumulated into an impulse response, then rendered using partitioned convolution (block 208). The final audio for both renderings is then mixed together for playback (block 212).

In some embodiments, the computation of high-order reflections is an important aspect of geometric sound propagation. Most of the reflected acoustic energy received at the listener's position after the early reflections in indoor scenes is due to late reverberation, the buildup and decay of many high-order reflections [Kuttruff 2007]. It has been shown that after the first 2 or 3 reflections, scattering becomes the dominant effect in most indoor scenes, even in rooms with relatively smooth surfaces [Lentz et al. 2007]. In addition, the sonic characteristics of the reverberation such as decay rate, directional effects, and frequency response vary with the relative locations of sound sources and listeners within a virtual environment. As a result, it is important to compute late reverberation in dynamic scenes based on high-order reflections and to incorporate scattering effects.

Previous work on geometric diffuse reflections has focused on Monte Carlo path tracing [Embrechts 2000]. These methods uniformly emit many rays or particles from each sound source, then diffusely reflect each ray through the scene up to a maximum number of bounces. Each ray represents a fraction of the sound source's total energy, and that energy is attenuated by both reflections off of objects in the scene and by air absorption as the ray propagates. If a ray intersects a listener, usually represented by a detection sphere the size of a human head, that ray's current energy is accumulated in the output impulse response (IR) for the sound source. These approaches are generally limited to low orders of reflections for interactive applications due to the large number of rays required for convergence.

More recently, the concepts of "diffuse-rain", proposed by Schröder [2011], and "diffuse-cache", proposed by [Schissler et al. 2014], have been used to accelerate interactive sound propagation. With diffuse-rain, each ray estimates the probability of the reflected ray intersecting the listener at every hit point along its path, rather than relying on rays to hit the listener by random chance. On the other hand, the diffuse-cache takes advantage of temporal coherence in the sound field to accelerate the computation of ray-traced diffuse reflections. A cache of rays that hit the listener during previous frames is used to maintain a moving average of the sound energy for a set of propagation paths that are quantized based on a scene surface subdivision.

However, the performance of these techniques is not interactive in scenes with many sound sources and high-order reflections. Each source emits many rays (e.g. thousands or tens of thousands), and the total cost scales linearly with the number of sound sources and reflection bounces that are simulated. Moreover, many of the rays that are emitted from the sources may never reach the listener, especially if the source and listener are in different parts of an interconnected environment. This results in a large amount of unnecessary computation.

The disclosed subject matter includes a system for simulating a high number of reflections in scenes with a large number of sources using backward ray tracing. Notably, the disclosed system (e.g., system 100) leverages the principle of acoustic reciprocity which states that the sound received at a listener from a source is the same as that produced if the source and listener exchanged positions [Case 1993]. Rather than emitting many rays from each sound source and intersecting them with the listener, BRT module 110 may trace rays backwards from only the listener's position and intersect them with sound sources. This provides significant savings in the number of rays required since the number of primary rays traced is no longer linearly dependent on the number of sources. Thus, BRT module 110 can achieve better scaling with the number of sources than with forward ray tracing, which allows the system (using BRT module 110) to compute high-order reflections for complex scenes with many sources at interactive rates. In some embodiment, sound sources may be represented as detection spheres with non-zero radii, though the formulation can be applied to sources with arbitrary geometric representation. Moreover, the disclosed subject matter may combine the diffuse-cache with diffuse-rain technique to increase the impulse-response density for late reverberation. In some embodiments, BRT module 110 computes specular reflections, diffuse reflections, and diffraction effects separately and combines the results.

In some embodiment, BRT module 110 is configured to initiate the emitting of uniform random rays from the listener, then reflecting those rays through the scene, up to a maximum number of bounces. Vector-based scattering [Christensen and Koutsouris 2013] is used to incorporate scattering effects with a scattering coefficient s∈[0,1] that indicates the fraction of incident sound that is diffusely reflected [and Rindel 2005]. With this formulation, the reflected ray is a linear combination of the specularly reflected ray and a ray scattered according to the Lambert distribution, where the amount of scattering in the reflection is controlled by s. After each bounce, a ray is traced (by BRT module 110) from the reflection point to each source in the scene to check if the source is visible. If so, the contribution from the source is accumulated in the diffuse cache.

Figure 3:
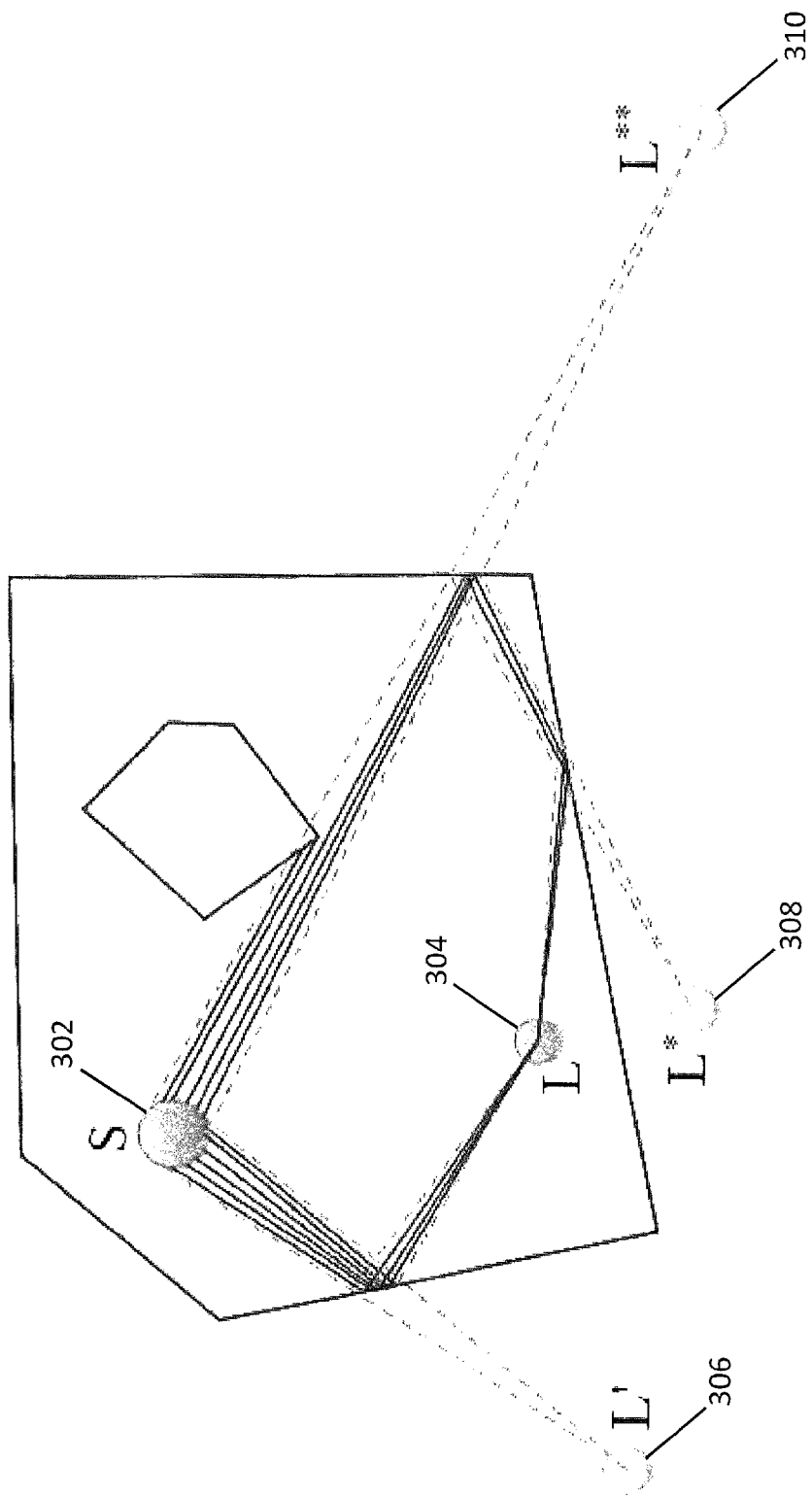
FIG. 3 is a diagram illustrating the determination of specular sound for spherical sources according to an embodiment of the subject matter described herein.

BRT module 110 may be configured to also extend the image source method to computing specular reflection paths for spherical sources by sampling the visibility of each path using random rays. To find specular paths, rays are traced by BRT module 110 from the listener and specularly reflected through the scene to find potential sound paths. Each combination of reflecting triangles is then checked to see if there is a valid specular path as shown in FIG. 3. For example, FIG. 3 depicts the manner in which specular sound can be computed for spherical sources. Notably, a first-order and second-order reflection are visible in FIG. 3. The listener 304 is reflected recursively over the sequence of reflecting planes. Afterwards, the cone containing source 302 and the last listener image (L' or L**) is sampled using a small number (e.g., 20) random rays. These rays are specularly reflected back to the listener 304.

In some embodiments, the listener's position is recursively reflected (by BRT module 110) over the sequence of planes containing the triangles, as in the original image source algorithm. Then, a small number of random rays (e.g., 20) are traced by BRT module 110 backwards from source 302 in the cone containing the source sphere with vertex at the final listener image position (e.g., 306 or 310). These rays are specularly reflected by BRT module 110 over the sequence of triangles back to the listener 304. The intensity of that specular path is multiplied by the fraction of rays that reach the listener to get the final intensity (i.e., the fraction of rays that are not occluded by obstacles is multiplied by the energy for the specular path to determine the final energy). The benefit of this approach executed by BRT module 110 to computing specular sound for area sources is that source images can become partially occluded, resulting in a smoother sound field for a moving listener. On the other hand, point sources produce abrupt changes in the sound field as specular reflections change for a moving listener. Modeling sources as spheres allows large sound sources (e.g. cars, helicopters, etc.) to be represented more accurately than with point sound sources.

After all rays are traced by BRT module 110 on each frame, the current contents of the diffuse cache for each source are used by module 112 to produce output impulse responses for the sources. The final sound for each reflection path is calculated by HCAR module 112 as a linear combination of the specular and diffuse sound energy based on the scattering coefficient s.

The performance of most sound propagation algorithms scales linearly with increasing numbers of sources and this is a significant bottleneck for the interactive simulation of large complex scenes. One way to achieve sub-linear scaling and reduce the computation required for propagation and rendering is to cluster sound sources. Prior techniques for handling large number of sources [Tsingos et al. 2004; Wand and Straβer 2004; Moeck et al. 2007] have been mainly used for auralization to generate direct sound or are combined with precomputed filters to generate different acoustic effects. These techniques do not take into account the position of obstacles in the scene or the relative visibility of sound sources or listeners when performing clustering. As a result, these techniques may not work well when the sources are in different acoustic spaces (e.g. adjacent rooms separated by a wall) or in scenes with many occluding obstacles. The disclosed subject matter presents an efficient approach (e.g., executed by SSC module 108) for clustering sound sources that uses visibility computations to handle complex scenes and high-order reflections and diffraction. The formulation is based on the observation that distant or occluded sound sources can be difficult to distinguish individually. This occurs when the sound field at a point is mainly due to late reverberation that masks the location of sources. [Griesinger 2009]. The disclosed subject matter uses a distance and angle-based clustering metric similar to that of [Tsingos et al. 2004], where sources are clustered more aggressively at greater distances from the listener. The approach uses the relative visibility among the sources in order to avoid incorrectly clustering sources that are in different rooms.

Figure 4:
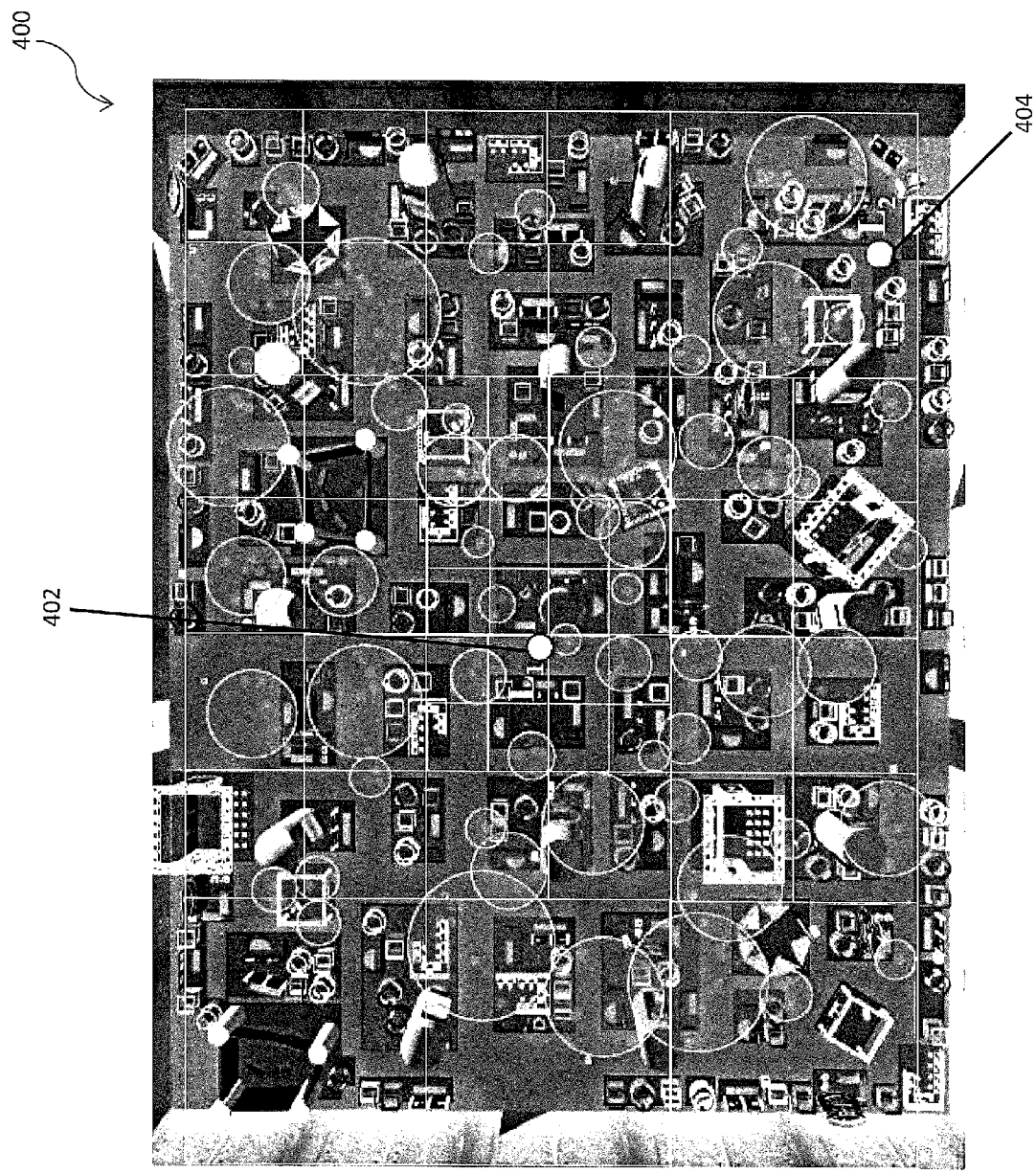
FIG. 4 is a diagram of a top-down view of a virtual scene with multiple sources according to an embodiment of the subject matter described herein.

Given a scene with a list of spherical sources $S_j$ and listener position L, a set of source clusters $C_k$ is computed based on the disclosed clustering metric. In some embodiments, SSC module 108 uses a dynamic octree to efficiently partition sources into groups that can then be independently clustered. SSC module 108 may be configured to ensure that the size of the leaf nodes of the octree is governed by our clustering metric. In particular, the size of the nodes increases with the distance of the node from the listener, as shown in FIG. 4. For example, FIG. 4 illustrates a top-down view of the Tradeshow scene 400 with 200 sources in which clustering has been done for listener $L_1$ 402. Further, clustering at listener $L_1$ 402 produces 95 clusters (2.1× reduction in number of sources), while clustering at listener $L_2$ 404 produces 52 clusters (3.8× reduction), since the clustering can be more aggressive. Notably, the size of nodes in the octree used to accelerate clustering increases with the distance from the listener.

To determine if a pair of sources are in the same acoustic space and therefore candidates for clustering, SSC module 108 may be configured to use ray tracing to compute the mutual visibility of the sources. In the simplest form, two sources cannot be clustered if there is no direct line-of-sight between them. This can be efficiently evaluated for point sources by tracing a single ray between each pair of sources in a potential cluster. However, this binary visibility may increase the number of clusters that are produced and it neglects the ability of sound to readily reflect and diffract around obstacles.

Figure 5:
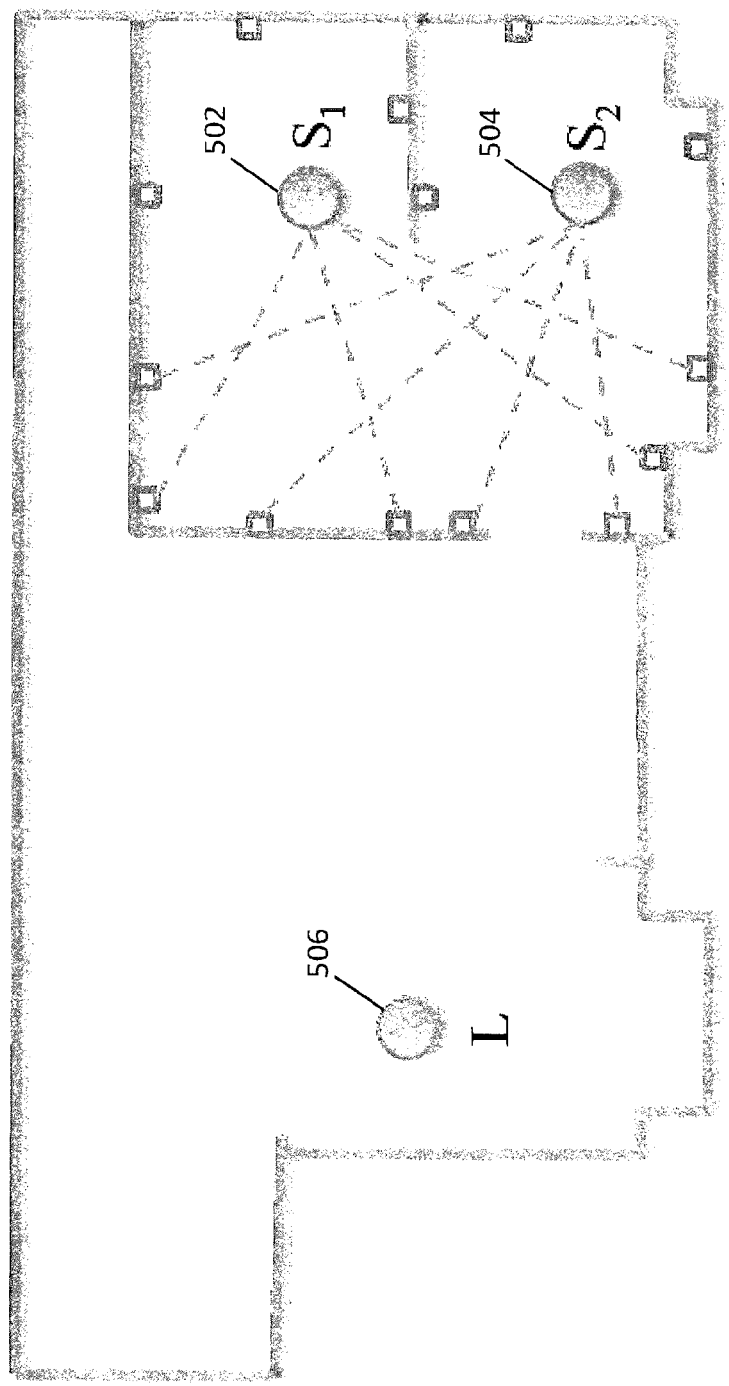
FIG. 5 is a diagram illustrating the determination of a soft relative visibility of two sound sources according to an embodiment of the subject matter described herein.

The disclosed subject matter proposes a soft visibility metric that instead traces a small number of rays (e.g., 50) from each sound source in uniform random directions and finds the intersection points with obstacles in the scene. An additional ray is traced by SSC module 108 (with or without BRT module 110) from each of the ray-scene intersections of $S_1$ to source $S_2$ (e.g., see sources 502 and 504 in FIG. 5) as well as from each of $S_2$'s ray-scene intersections to source $S_1$. For two sources $S_1$ and $S_2$, the soft relative visibility $v \in [0,1]$ is determined by the fraction of these scene intersection points that are visible to the other source and not occluded by any obstacles. If the relative visibility $v$ of two sources is greater than some threshold amount $v_{min}$, the sources are clustered. In some embodiment, SSC module 108 may use $v_{min} = 0.5$, indicating that sources must be visible to at least 50% of the intersection points to be clustered. With this approach, sources are clustered if the sources can see the same parts of the scene, rather than only considering line-of-sight visibility. FIG. 5 illustrates this approach. For example, SSC module 108 may compute the soft relative visibility $v$ of two sound sources by first tracing a small number of random rays from each of sources 502 and 504, then determining the fraction of the ray-scene intersections that are visible to the other source. If $v > v_{min}$, a pair of sources is considered for clustering. In this scenario, $S_1$, 502 and $S_2$ 504 do not have direct line-of-sight visibility but will still be clustered by SSC module 108 since they have significant first-order visibility and can be assumed to reside in the same acoustic space.

After sources have been partitioned into valid clusters by SSC module 108, each cluster is then used for sound propagation as a proxy for the sound source(s) it contains. The proxy source for each cluster is represented during sound propagation by a larger bounding sphere around its individual sources that is centered at their centroid.

In order to deal with clusters rather than individual sound sources, the disclosed sound propagation algorithm can be modified. Clustered sources use a larger detection sphere, which may result in too much sound energy for sources with small radii that are part of a cluster. In addition, the caches that are used to exploit temporal coherence can be handled differently for the clusters.

After the sources in the scene have been clustered based on the clustering criteria (by SSC module 108), the sound propagation algorithm executed by BRT module 110 proceeds. Each cluster is propagated by BRT module 110 as if it were a spherical sound source with that cluster's centroid and bounding sphere radius. This approach works well for computing specular and diffraction sound paths, since those algorithms assume point sound sources. However, the sound energy computed for clusters is incorrect, since the probability of hitting a large spherical clustered source detector is much greater than the probability of hitting a small unclustered source. BRT module 110 can overcome this shortcoming by applying a normalization factor to the sound energy computation to compensate for the increased detector size. In a diffuse sound field, the probability of a ray hitting a spherical detector is proportional to the projected silhouette area of the sphere on a plane, $\pi r^2$. Therefore, in order to compensate for the increased hit probability, the normalization factor $w$ used by BRT module 108 is the ratio of the source's silhouette area to the cluster's silhouette area:

$$w = \frac{\pi r_i^2}{\pi r_{BS}^2}. \quad (1)$$

By applying this normalization factor to every diffuse path, the total diffuse energy from the source is approximately the same, independent of the source detector size or whether or not it is clustered. This allows the use of large cluster detectors for distant clustered sources without significantly affecting the sound quality.

Another consideration for clustered sound propagation is maintaining the cache data structures used to take advantage of temporal coherence. While computing the sound propagation paths, each source stores a cache of both specular and diffuse reflectance data (paths) from previous frames. When a previously unclustered source becomes a member of a cluster during the current frame, the cache for the source is merged with the cluster's cache, so that the cluster's cache now contains the accumulation of both caches. To merge the cache, all sound paths for the source are inserted in the cluster's cache. If there are any duplicate paths with the same hash code, their contributions are summed into a single path. Likewise, when a previously clustered source becomes unclustered, the cache for the cluster is copied and a copy is associated with the cache associated with the source. By handling the caches in this way, BRT module 110 may generate smooth transitions in the acoustic responses for sources that become clustered.

An important aspect of interactive sound propagation is the auralization of the resulting propagation paths. For scenes with high numbers of sources and high-order reflections, there may be hundreds of thousands or more of individual paths to render. For moving sources and listeners, there may also be different amounts of Doppler shifting for each propagation path, depending on the extent of source or listener motion relative to the propagation medium. Therefore, in order to accurately render the audio for a dynamic real-time simulation, it may be necessary to render Doppler shifting for millions of propagation paths. Previous techniques for rendering Doppler shifting, such as fractionally-interpolated delay lines [Wenzel et al. 2000], become prohibitively expensive when the number of sound paths grows over a few thousand. On the other hand, partitioned frequency-domain convolution is ideal for efficiently rendering arbitrarily-complex impulse responses, but cannot perform accurate Doppler shifting.

The disclosed subject matter presents a hybrid rendering system which uses interpolating delay lines for propagation paths with perceptually-significant Doppler shifting and partitioned impulse-response convolution for the other paths. By dynamically switching between these methods using a psychoacoustic metric, HCAR module 112 can be used to reduce the amount of computation for path delay interpolation because only a few sound paths must be rendered using the expensive interpolation. The input of the audio rendering algorithm (executed by HCAR module 112) is a list of acoustic responses and one or more sound sources (e.g. clustered sources) that should be rendered using each IR. During sound propagation, HCAR module 112 may determine which rendering method should be used for new sound paths based on the amount of Doppler shifting. In some embodiments, HCAR module 112 may use the relative speed of the source and listener along each path, $\delta v$, to compute the shift amount, then compare this amount to a psychoacoustic threshold to sort the paths into one category or the other.

The amount of Doppler shifting s that shifts the frequency f to f̃ is given by the following relation, where the motion of the source and listener are small relative to the speed of sound c:

$$\tilde{f} = sf = \left(1 + \frac{\delta v}{c}\right)f. \quad (2)$$

HCAR module 112 may convert the shift s to a signed shift in cents (e.g., $\frac{1}{100}^{th}$ of a half-tone interval) on a log frequency scale using the relation $s_{cents}=1200 \log_2(s)$. The Doppler shift amount $s_{cents}$ is compared to a parameter $s_{min}$ that signifies the threshold above which paths have significant shifting. If $|s_{cents}|>s_{min}$ for a given path, that path is rendered using a fractional delay line. Otherwise, the path is added by HCAR module 112 to the convolution impulse response. Previous work in psychoacoustics has shown that the human ear has difficulty distinguishing pitch shifts of up to 20 cents or more [et~al. 2012], so HCAR module 112 may be configured in some embodiments to use $s_{min}=20$ cents. To maintain real-time performance for audio rendering of thousands of paths, HCAR module 112 may allow the value of $s_{min}$ to be scaled based on the current system load. If there are too many Doppler-shifted paths to render interactively, the paths are sorted (by HCAR module 112) by decreasing amount of shift, weighted by the per-path sound intensity. As many paths as the CPU budget allows are then rendered from this sorted list using delay interpolation while the remaining paths are rendered using convolution.

In some embodiments, BRT module 110 may be configured to trace rays from the listener and recursively reflected through the scene to determine possible specular, diffuse, and diffraction paths. For example, BRT module 110 may use a combination of the spherical image source method for specular paths and diffuse path tracing for diffuse reflections. Edge diffraction (up to order 3) is computed by BRT module 110 by using the high-order UTD algorithm from [Schissler et al. 2014]. BRT module 110 may be further configured to use per-triangle material parameters to model frequency-dependent reflection attenuation and scattering [Christensen and Rindel 2005]. The source spheres for the simulations were set to be the bounding spheres of the objects producing the sound. The number of rays reflections traced for each benchmark is summarized in FIG. 12.

Notably, the aural complexity of different scenes used to evaluate the performance of the sound propagation and rendering pipeline is highlighted. The source clustering performed by SSC module 108 can reduce the number of sources by 20-50%. Similarly, dynamic late reverberation can be computed at interactive rates for complex indoor and outdoor scenes. The average number of clusters computed for each benchmark and the time spent in cluster computation is highlighted. The hybrid rendering significantly reduces the number of Doppler-shifted paths that are rendered. In the system, the audio rendering computation is concurrent with propagation, and so the total time per frame is the maximum of the time for propagation or for rendering. All values reported are the average for the entire benchmark sequence and are computed on a 3.5 GHz 4-core CPU. In practice, it has been observed that this number of rays provided a nice tradeoff in terms of IR quality and computation time.

In some embodiments, audio may be rendered by system 100 for the simulations at 44.1 kHz using 4 logarithmically-distributed frequency bands to divide the human hearing range, such as: 0-110 Hz, 110-630 Hz, 630-3500 Hz, and 3500-22050 Hz. This allows efficient use of 4-wide vector instruction. A fractional delay interpolation module may render frequency-dependent audio by pre-filtering source audio into bands that written to a circular delay buffer. Doppler-shifted propagation paths are rendered (by HCAR module 112) by reading interpolated delay taps from the delay buffer using linear resampling, then mixing at the appropriate place in the output buffer. HCAR module 112 uses a non-uniform partitioning scheme for low-latency streaming real-time convolution. Each sound path is spatialized (by HCAR module 112) using vector-based amplitude panning for arbitrary speaker arrays [Pulkki 1997]. Frequency-dependent IRs for convolution are computed (by HCAR module 112) by band-pass filtering each IR band by its respective filters and then summing the filtered IRs to produce the final time-domain IR. The partitions in each IR are updated by module 112 at varying rates that correspond to the FFT size for the partition, with later parts of the IR updated at slower rates than the early parts. The outputs from the convolution and delay-interpolation modules are mixed by HCAR module 112 for each source cluster, then each cluster's output is mixed to the final output buffer.

The disclosed subject matter makes use of SIMD instructions and the multithreading capabilities of current CPUs to accelerate sound propagation and rendering. In some embodiments, the ray tracer uses a 4-wide BVH (bounding volume hierarchy) with efficient SIMD traversal for incoherent rays. The sound propagation module is highly parallelized and performance scales linearly with the number of available CPU cores. Each sound propagation thread (executed by BRT module 110) computes the sound for a subset of the total number of rays traced per frame. The propagation paths produced by each thread are merged once that thread finishes its computation. The audio rendering module (e.g., HCAR module 112) uses two concurrent processing threads that each manage a small pool of threads. One of the processing threads takes a buffer of propagation paths from the BRT module on each frame and asynchronously builds a frequency-dependent impulse response for each source in parallel using its thread pool. Once computed by module xxx, each impulse response is atomically swapped with the previous impulse response for the source cluster. The other concurrent rendering thread runs from the output device driver and schedules the asynchronous processing of non-uniform partitioned convolution. The convolution processing runs on as many threads as there are partition sizes, where the thread for each partition size has its own scheduling requirements. In practice, the highly parallel architecture results in a system that scales well to any number of CPU cores and can maintain load-balanced real-time processing without audio dropouts for scenes with hundreds of sources on commodity CPUs.

The sound propagation system is evaluated on indoor and outdoor scenes with large volumes and high model complexity. Our approach can generate plausible acoustic effects, including specular and diffuse reflections and edge-diffraction, at interactive rates on a 4-core CPU (see Table 1200 in FIG. 12).

Tradeshow: The listener walks around an indoor tradeshow floor with 200 people, where each person is a sound source. We show the benefits of clustering distant sources in order to reduce the computational load.

City: In a large outdoor city environment, there are 50 moving sound sources, including cars, trucks, planes, and helicopters. This scene shows how our approach can scale well to challenging large environments and can interactively compute reverberation for multiple moving sources.

Sibenik: This cathedral scene demonstrates the necessity of high-order diffuse reflections to generate plausible late reverberation. A virtual orchestra with 18 sound sources plays classical music.

Figure 8:
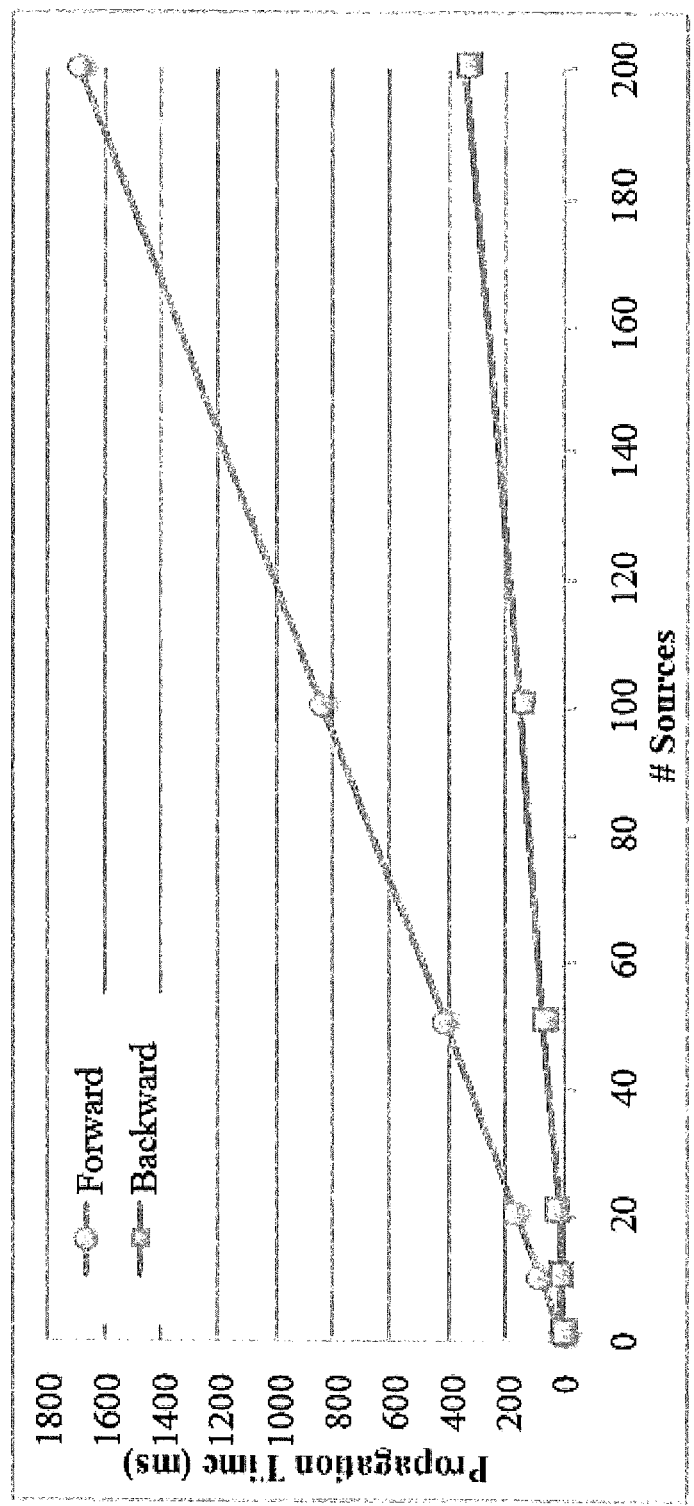
FIG. 8 is a line graph illustrating the performance of backward versus forward diffuse path tracing in a virtual scene according to an embodiment of the subject matter described herein.
Figure 9:
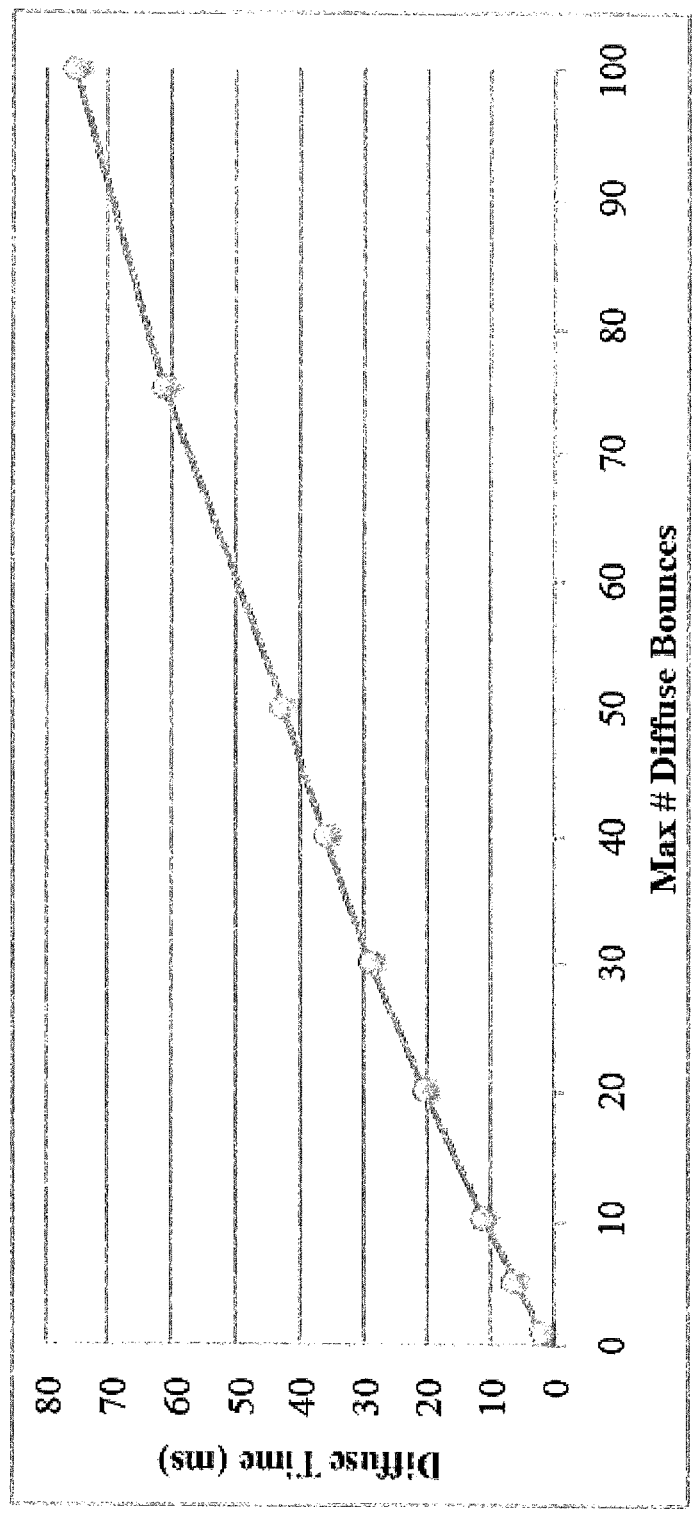
FIG. 9 is a line graph illustrating the performance of a propagation algorithm as a function of maximum diffuse reflection order in a virtual scene according to an embodiment of the subject matter described herein.

By tracing rays backward from the listener, rather than from sources, the algorithm (executed by BRT module 110) for high-order reflections significantly reduces the computation required to compute late reverberation for many sources. FIG. 9 highlights the performance benefit of tracing rays from the listener when there are many sound sources. Notably, FIG. 9 highlights the performance of the propagation algorithm as a function of maximum diffuse reflection order in the Sibenik scene (no clustering). The approach is capable of computing dynamic late reverberation at interactive rates in complex scenes. For 200 sources in the Tradeshow benchmark, backward ray propagation is 4.8 times faster than a forward ray tracing approach. The disclosed subject matter also demonstrate how the performance of our algorithm scales with the maximum reflection order. FIG. 8 shows that the time for sound propagation is a linear function of the number of ray bounces. Notably, FIG. 8 highlights the performance of backward versus forward diffuse path tracing on the Tradeshow scene with varying numbers of sources (no clustering). By tracing rays from the listener, improved performance is obtained for many sound sources since fewer rays are traced overall. Performance is still linear in the number of sources due to the linear number of ray vs. sphere intersections that must be computed for backward ray propagation. In order to compare the accuracy of our approach with traditional forward ray tracing. An average error of around 0.5 dB in the total broad-band sound energy is observed using the backward ray-tracing algorithm (executed by BRT module 110) for a moving listener in the Sibenik benchmark when compared to forward ray tracing with 50 k rays. These results show that backwards sound propagation is a viable method for computing dynamic late reverberation effects in scenes with many sources at interactive rates.

Figure 6:
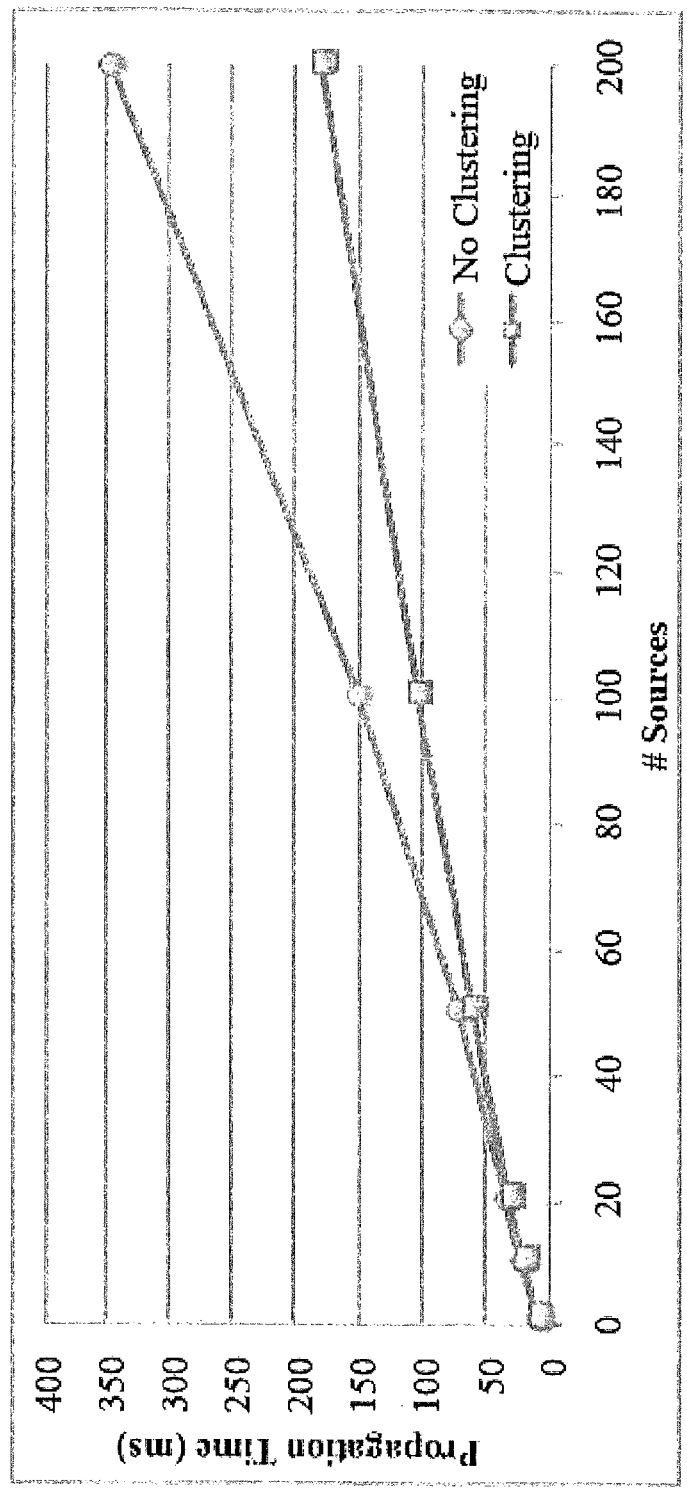
FIG. 6 is a line graph illustrating the propagation time exhibited a number of sound sources that are both clustered and not clustered according to an embodiment of the subject matter described herein.

The runtime performance of our source clustering algorithm (as executed by module 108) has been analyzed, as well as the error it introduces. In the Tradeshow benchmark with 200 sources, the clustering algorithm takes 0.21 ms and generates 95 clusters for sound propagation, on average. This corresponds to 1.9× speedup, as shown in FIG. 6. Notably, FIG. 6 highlights the time taken per frame by the sound propagation system for varying the numbers of sources in the Tradeshow scene, both with and without source clustering for backward sound propagation. Sub-linear scaling with the number of sources due to source clustering may be obtained and/or determined by BRT module 110.

Figure 7:
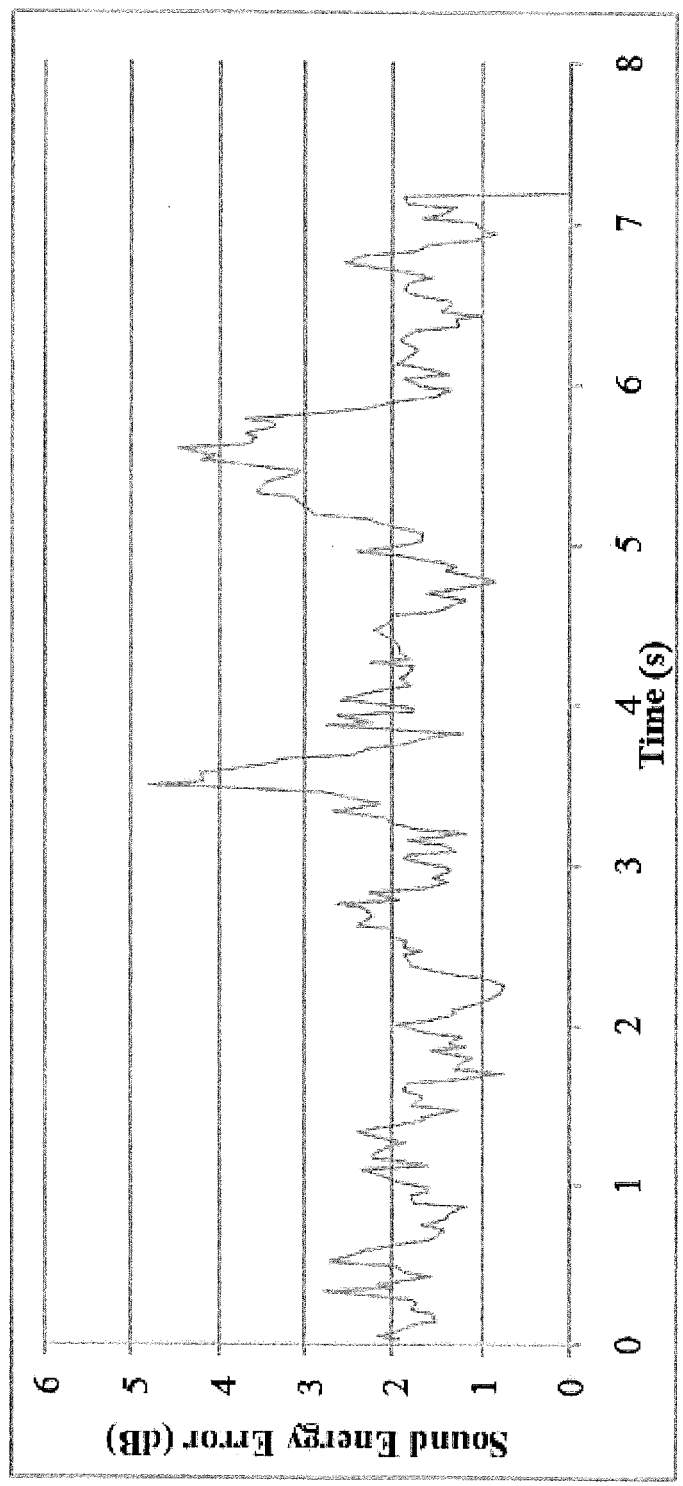
FIG. 7 is a line graph illustrating the error in the total sound energy of a virtual scene according to an embodiment of the subject matter described herein.

In general, the clustering reduces the number of sources by around a factor of 2 for the tested scenes. However, there may be some scenarios where the clustering can provide more significant reduction in the number of sources, especially when many of the sources are far away from the listener. This is illustrated for the Tradeshow scene in FIG. 4, where a reduction in the number of sources of 3.8× is achieved for a listener that is far away from most sources, versus a reduction of 2.1× for a listener in the center of the sources. The time taken to compute the clustering for our benchmarks is shown in Table 1200 in FIG. 12. For 1000 sources, the clustering takes 0.81 ms. Overall, the clustering algorithm scales well with a large numbers of sources. In FIG. 7, the error introduced by clustering for a single group of sources in the Sibenik scene is analyzed (e.g., by module 108). These results demonstrate that the clustering algorithm, as executed by module 108, can be used to effectively reduce the computation required for sound propagation in complex scenes, and that the algorithm introduces only a relatively small error in the final sound output. Namely, FIG. 7 depicts a graph illustrating the error in the total sound energy in the Sibenik scene due to our clustering approach for a single cluster with 5 sources. In this case, the listener moves towards the cluster until it is divided into individual sources after 7 seconds. FIG. 7 further shows the maximum error in dB among all sources in the cluster for each frame. The average error for the entire simulation is 1.98 dB. These results show the clustering algorithm can be used to effectively reduce the computation required for sound propagation in complex scenes, and that it introduces only a relatively small error in the final sound output.

Table 1200 in FIG. 12 summarizes the performance of the sound-rendering approach for various scenes. In order to efficiently compute Doppler-shifted sound effects in aurally complex scenes, the algorithm (as executed by HCAR module 112) uses a perceptual metric for the amount of Doppler shifting to sort and render the propagation paths. In some embodiments, the rendering system is able to render the audio for 200 sources and 871K propagation paths in the Tradeshow scene in real time by only rendering Doppler effects on a subset the paths, and using partitioned convolution for the other paths. When compared with a system that uses only delay-interpolation rendering, the present approach results in 5.2-times reduction in rendering time versus a system based on only delay interpolation rendering. The disclosed subject matter also allows for the selective computation of Doppler shifting for significant paths at an extra cost of only 10-20% over basic partitioned convolution.

Temporal Coherence: The disclosed system further makes use of the "diffuse-cache" technique proposed by [Schissler et al. 2014] that uses a cache of sound energy from previous frames to incrementally compute the diffuse sound contribution for the current frame. This results in many fewer rays to be traced on each frame with similar sound quality, thereby improving the interactivity of the resulting sound propagation algorithm. However, this approach can also introduce some small errors in the resulting sound, especially for fast-moving sources, listeners, or objects in the scene. In some such cases, the diffuse cache will take a few frames to update to the changes in the sound. The response time is controllable via a parameter $\tau$, such as $\tau=2s$. In practice, this provides a good balance between responsiveness and good sound quality. In some embodiments, the system compares the results with and without the diffuse cache in the supplementary video and demonstrates that the slower response or update time is not very noticeable (or audible) in practice, even for fast-moving sources and listeners.

Figure 10:
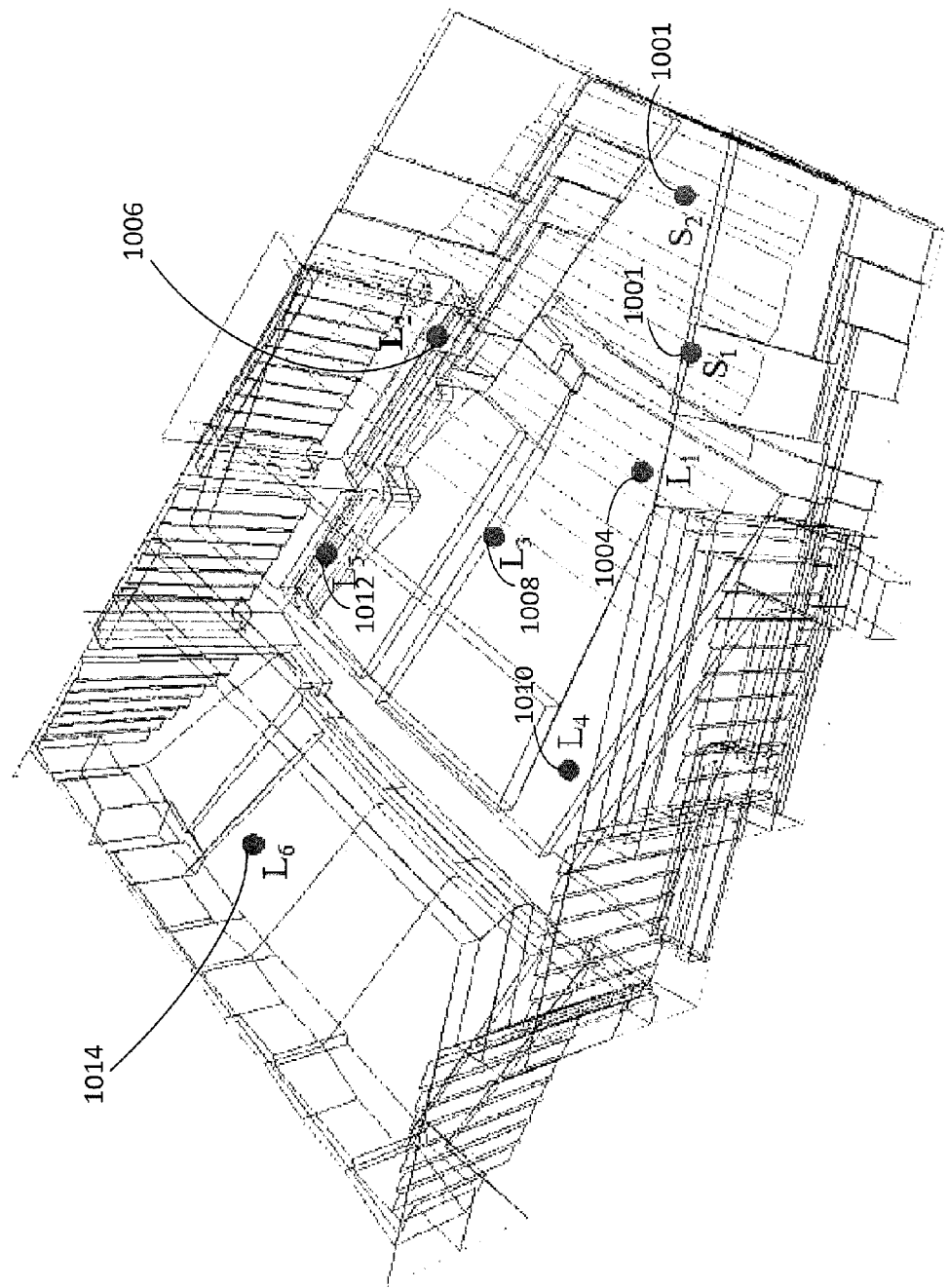
FIG. 10 is a diagram illustrating a virtual benchmark scene according to an embodiment of the subject matter described herein.

In order to verify the accuracy of the results, a comparison was conducted between the disclosed system and version 12 of the offline commercial architectural acoustics software ODEON that has been shown to accurately predict the acoustic properties of real-world rooms by comparing the simulation results with actual measurements [Rindel and Christensen 2003, Christensen et al. 2008]. ODEON uses a combination of ray tracing from sound sources for late reverberation and the image source method for early reflections (i.e. up to order 2) [Christensen and Koutsouris 2013]. The ODEON Elmia Round Robin benchmark was used for the comparison and has two sound sources and six listener locations. The scene is shown in FIG. 10, which highlights the performance of the propagation algorithm as a function of maximum diffuse reflection order in the Sibenik scene (no clustering). In particular, FIG. 10 depicts an Elmia Round Robin benchmark scene that was used to compare the accuracy of the present system to the commercial ODEON acoustics software. The scene consists of a concert hall with two sources 1001 and 1002 on the stage and six listeners 1004-1014 in the audience. The benchmark is static. Impulse responses were generated at each listener position and compared to the results from ODEON. Notably, the approach is capable of computing dynamic late reverberation at interactive rates in complex scenes.

Furthermore, it has been shown that the impulse responses simulated using ODEON on this benchmark match closely with the actual measurements [Rindel and Christensen 2003]. As a result, BRT module 108 may be utilized to compare the impulse responses computed using our interactive backward ray-tracing based algorithm with those computed using ODEON, which is a non-interactive system. The impulse response energy decay curves for each frequency band were computed at each listener position in both ODEON and the disclosed sound propagation system. Good correspondence between the present system and ODEON was found for the listener positions with error of −2.7 dB, 0.75 dB, −1.2 dB, and 1.6 dB was found for the 125 Hz, 500 Hz, 2 kHz, and 8 kHz bands respectively. For example, at listener position $L_5$ which is more distant and toward one side of the room, similar results were found with error of −0.4 dB, 1.2 dB, −1.8 dB, and 0.1 dB for the same frequency bands. These results demonstrate that the present sound propagation system has accuracy comparable to existing commercial geometric acoustics systems that have been validated against real-world measurements.

The generation of plausible dynamic late reverberation is regarded as a challenging problem in interactive sound propagation [Valmaki et al. 2012]. Previous interactive systems compute early reflections using ray tracing and combine them with statistical techniques for late reverberation [Antani and Manocha 2013; Taylor et al. 2012; Schissler et al. 2014]. However, statistical reverberation techniques are not able to model certain scenes and effects. Outdoor scenes and coupled spaces are a challenge because the reverb does not decay according to simple room acoustic models [Tsingos 2009]. In addition, dynamic scenes can have varying reverberation that is difficult to predict, such as when a door opens or closes or when a sound source or listener moves in an environment. Furthermore, statistical methods cannot handle directional reverberation effects, such as with a sound source at the other end of a long reverberant hallway that produces reverberant sound from the direction of the source. Techniques based on the acoustic-rendering equation require considerable precomputation, are primarily limited to static scenes, and can take about 193 ms to handle a single source [Antani et al. 2012]. Moreover, their accuracy is governed by the sampling scheme and they cannot handle dynamic changes in the scene geometry that affect the quality of reverb, such as with a large door opening or closing. Other methods for LR computation are based on using a coarse spatial subdivision for wave-based simulation [Raghuvanshi et al. 2010] and are limited to small static indoor scenes. In contrast, our system is able to compute dynamic late reverberation with no preprocessing for the Tradeshow scene with 200 source in 182.7 ms, more than an order of magnitude faster than prior path tracing and other LR algorithms for the same scene.

Figure 11:
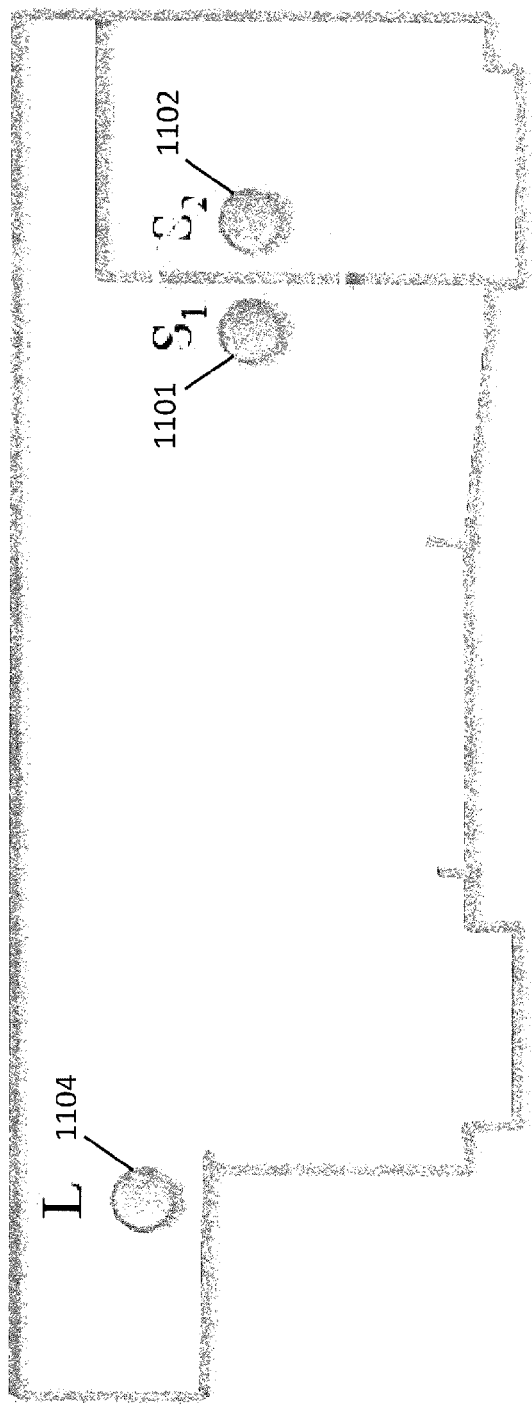
FIG. 11 is a diagram illustrating a clustering approach that does not consider obstacles in a virtual scene.

The prior techniques for handling large numbers of sources either focus on clustering sources for spatial sound rendering (e.g. HRTFs) or techniques based on reverberation filters, rather than geometric sound propagation. Our approach is complimentary to these methods. The algorithm in [Tsingos et al. 2004] can cluster 355 sources into 20 clusters in 1.14 ms, while the work of [Moeck et al. 2007] can cluster 1815 dynamic sound sources into 12 clusters for 3D sound spatialization in a game engine. However, when performing the clustering, these systems do not take into account the positions of the obstacles or the relative visibility of the sources and may therefore introduce more error. FIG. 11 depicts a situation where visibility is important for correct clustering. For example, FIG. 11 illustrates a previous clustering approach that does not consider obstacles in the scene while generating the clusters and can incorrectly cluster sources $S_1$ 1101 and $S_2$ 1102 that are close to each other but in different rooms, as shown by the circle enclosing $S_1$ and $S_2$. Consequently, the listener 1104 hears clustered source $S_2$ 1102 even though the source should be inaudible. Notably, the results generated by SSC module 108 utilizes relative visibility information and thus, is better suited for sound propagation.

Prior approaches to rendering many sound sources have used stochastic importance sampling to reduce the number of propagation paths rendered for a sound source from 20K to 150 [Wand and Straβer 2004]. These methods can render 150 Doppler-shifted paths in real time. Another approach based on fractional delay lines is able to render 700 sound sources (propagation paths) on the CPU and up to 1050 on a GPU using texture resampling [Gallo et al. 2004]. However, these algorithms cannot handle the hundreds of thousands of paths that arise in high aural complexity benchmarks at an interactive rate. Frequency-domain convolution algorithms fare better because these algorithms do not operate on discrete propagation paths, but these algorithms cannot perform accurate Doppler shifting. The algorithm described in [Battenberg and Avizienis 2011] can render 100-200 independent channels of time-invariant convolution on a 6-core CPU, while [Müller-Tomfelde 2001] describes a technique to efficiently implement time-varying convolution. In contrast, the algorithm executed by HCAR module 112 can handle both Doppler shifting and large numbers of propagation paths. Notably, HCAR module 112 may use Doppler shifting information for each propagation path to sort and render the paths using either fractional delay lines or partitioned convolution. The algorithm (as executed by HCAR module 112) can thereby render 871K propagation paths for 200 sources in real time. Significant benefit is obtained by performing expensive delay interpolation only when there is significant Doppler shifting. In the Tradeshow scene, the system renders 17 Doppler-shifted paths and 190 channels of partitioned convolution in real time.

An interactive algorithm for sound propagation and rendering in complex, dynamic scenes with a large number of sources is presented. The formulation combines fast backward ray tracing from the listener with sound source clustering to compute propagation paths. Furthermore, a novel, hybrid convolution audio rendering algorithm that can render hundreds of thousands of paths at interactive rates is used. The algorithm's performance is demonstrated on complex indoor and outdoor scenes with high aural complexity, and significant speedups over prior algorithms are observed.

The disclosure of each of the following references is incorporated herein by reference in its entirety.

Antani, L., and Manocha, D. 2013. Aural proxies and directionally varying reverberation for interactive sound propagation in virtual environments. *IEEE Transactions on Visualization and Computer Graphics* 19, 4, 567-575.

Antani, L., Chandak, A., Savioja, L., and Manocha, D. 2012. Interactive sound propagation using compact acoustic transfer operators. *ACM Trans. Graph.* 31, 1 (February), 7:1-7:12.

Battenberg, E., and Avizienis, R. 2011. Implementing real-time partitioned convolution algorithms on conventional operating systems. In *Proceedings of the 14th International Conference on Digital Audio Effects. Paris, France.*

Case, K. 1993. Structural acoustics: A general form of reciprocity principles in acoustics. Tech. rep. JSR-92-193. The MITRE Corporation.

Chandak, A., Antani, L., Taylor, M., and Manocha, D. 2009. Fastv: From-point visibility culling on complex models. *Computer Graphics Forum (Proc. of EGSR)* 28, 3, 1237-1247.

Christensen, C., and Koutsouris, G. 2013. Odeon manual, chapter 6.

Christensen, C. L., and Rindel, J. H. 2005. A new scattering method that combines roughness and diffraction effects. In *Forum Acousticum, Budapest, Hungary.*

Christensen, C., Nielsen, G., and Rindel, J. 2008. Danish acoustical society round robin on room acoustic computer modeling. *Odeon A/S: Lyngby, Denmark.*

Embrechts, J. J. 2000. Broad spectrum diffusion model for room acoustics ray-tracing algorithms. *The Journal of the Acoustical Society of America* 107, 4, 2068-2081.

Fouad, H., Hahn, J., and Ballas, J. 1997. Perceptually based scheduling algorithms for real-time synthesis of complex sonic environments. In *Proceedings of International Conference on Auditory Display.*

Funkhouser, T., Carlbom, I., Elko, G., Pingali, G., Sondhi, M., and West, J. 1998. A beam tracing approach to acoustic modeling for interactive virtual environments. In *Proc. of ACM SIGGRAPH,* 21-32.

Gallo, E., Tsingos, N., et al. 2004. Efficient 3D audio processing on the GPU. In *ACM Workshop on General Purpose Computing on Graphics Processors.*

Geringer, J. M., MacLeod, R. B., and Sasanfar, J. 2012. High school string players perception of violin, trumpet, and voice intonation. *String Research Journal* 3, 81-96.

Griesinger, D. 2009. The importance of the direct to reverberant ratio in the perception of distance, localization, clarity, and envelopment. In *Audio Engineering Society Convention* 126, Audio Engineering Society.

Herder, J. 1999. Optimization of sound spatialization resource management through clustering. In *The Journal of Three Dimensional Images, 3D-Forum Society*, vol. 13, 59-65.

James, D. L., Barbic, J., and Pai, D. K. 2006. Precomputed acoustic transfer: output-sensitive, accurate sound generation for geometrically complex vibration sources. In *Proc. of ACM SIGGRAPH,* 987-995.

Krokstad, A., Strom, S., and Sorsdal, S. 1968. Calculating the acoustical room response by the use of a ray tracing technique. *Journal of Sound and Vibration* 8, 1 (July), 118-125.

Kulp, B. D. 1988. Digital equalization using fourier transform techniques. In *Audio Engineering Society Convention* 85, Audio Engineering Society.

Kuttruff, H. 2007. *Acoustics: An Introduction.* Taylor and Francis, New York.

Lentz, T., Schröder, D., Vorländer, M., and Assenmacher, I. 2007. Virtual reality system with integrated sound field simulation and reproduction. *EURASIP Journal on Advances in Singal Processing* 2007 (January), 187-187.

Mehra, R., Raghuvanshi, N., Antani, L., Chandak, A., Curtis, S., and Manocha, D. 2013. Wave-based sound propagation in large open scenes using an equivalent source formulation. *ACM Trans. on Graphics* 32, 2, 19:1-19:13.

Moeck, T., Bonneel, N., Tsingos, N., Drettakis, G., Viaud-Delmon, I., and Alloza, D. 2007. Progressive perceptual audio rendering of complex scenes. In *Proceedings of Symposium on Interactive 3D graphics and games,* ACM, 189-196.

Müller-Tomfelde, C. 2001. Time-varying filter in non-uniform block convolution. In *Proc. of the COST G-6 Conference on Digital Audio Effects.*

Pelzer, S., and Vorländer, M. 2010. Frequency- and time-dependent geometry for real-time auralizations. In *Proceedings of 20th International Congress on Acoustics, ICA.*

Pulkki, V. 1997. Virtual sound source positioning using vector base amplitude panning. *Journal of the Audio Engineering Society* 45, 6, 456-466.

Raghuvanshi, N., Snyder, J., Mehra, R., Lin, M., and Govindaraju, N. 2010. Precomputed wave simualtion for real-time sound propagation of dynamic sources in complex scenes. *ACM Trans. on Graphics* 29, 4, 68:1-68:11.

Rindel, J. H., and Christensen, C. L. 2003. Room acoustic simulation and auralization—how close can we get to the real room? In *Proc. 8th Western Pacific Acoustics Conference, Melbourne.*

Savioja, L., Huopaniemi, J., Lokki, T., and Väänänen, R. 1999. Creating interactive virtual acoustic environments. *Journal of the Audio Engineering Society (JAES)* 47, 9 (September), 675-705.

Savioja, L., Lokki, T., and Huopaniemi, J. 2002. Auralization applying the parametric room acoustic modeling technique—the diva auralization system. *8th Int. Conf. on Auditory Display,* 219-224.

Schissler, C., Mehra, R., and Manocha, D. 2014. High-order diffraction and diffuse reflections for interactive sound propagation in large environments. *ACM Transactions on Graphics* (SIGGRAPH 2014) 33, 4, 39.

Schröder, D. 2011. *Physically based real-time auralization of interactive virtual environments,* vol. 11. Logos Verlag Berlin GmbH.

Schroeder, M. R. 1962. Natural sounding artificial reverberation. *Journal of the Audio Engineering Society* 10, 3, 219-223.

Siltanen, S., Lokki, T., Kiminki, S., and Savioja, L. 2007. The room acoustic rendering equation. *The Journal of the Acoustical Society of America* 122, 3 (September), 1624-1635.

Siltanen, S., Lokki, T., Savioja, L., and Lynge Christensen, C. 2008. Geometry reduction in room acoustics modeling. *Acta Acustica united with Acustica* 94, 3, 410-418.

Taylor, M., Chandak, A., Antani, L., and Manocha, D. 2009. Resound: interactive sound rendering for dynamic virtual environments. In *MM '09: Proceedings of the seventeen ACM international conference on Multimedia,* ACM, 271-280.

Taylor, M., Chandak, A., Mo, Q., Lauterbach, C., Schissler, C., and Manocha, D. 2012. Guided multiview ray tracing for fast auralization. *IEEE Transactions on Visualization and Computer Graphics* 18, 1797-1810.

Tsingos, N., Funkhouser, T., Ngan, A., and Carlbom, I. 2001. Modeling acoustics in virtual environments using the uniform theory of diffraction. In *Proc. of ACM SIGGRAPH,* 545-552.

Tsingos, N., Gallo, E., and Drettakis, G. 2004. Perceptual audio rendering of complex virtual environments. *ACM Trans. Graph.* 23, 3, 249-258.

Tsingos, N., Dachsbacher, C., Lefebvre, S., and Dellepiane, M. 2007. Instant sound scattering. In *Proceedings of the Eurographics Symposium on Rendering,* 111-120.

Tsingos, N. 2001. A versatile software architecture for virtual audio simulations. In *International Conference on Auditory Display (ICAD).*

Tsingos, N. 2009. Pre-computing geometry-based reverberation effects for games. In *AES Conference on Audio for Games.*

Valimaki, V., Parker, J. D., Savioja, L., Smith, J. O., and Abel, J. S. 2012. Fifty years of artificial reverberation. *IEEE Transactions on Audio, Speech, and Language Processing* 20, 5, 1421-1448.

Vorländer, M. 1989. Simulation of the transient and steady-state sound propagation in rooms using a new combined ray-tracing/image-source algorithm. *The Journal of the Acoustical Society of America* 86, 1, 172-178.

Wand, M., and Straβer, W. 2004. Multi-resolution sound rendering. In *SPBG '04 Symposium on Point-Based Graphics* 2004, 3-11.

Wang, L. M., Rathsam, J., and Ryherd, S. R. 2004. Interactions of model detail level and scattering coefficients in room acoustic computer simulation. In *International Symposium on Room Acoustics: Design and Science.*

Wefers, F., and Vorländer, M. 2014. Efficient time-varying FIR filtering using crossfading implemented in the DFT domain. In *Forum Acousticum, Krakow, Poland*, European Acoustics Association.

Wenzel, E. M., Miller, J. D., and Abel, J. S. 2000. A software-based system for interactive spatial sound synthesis. In *ICAD, 6th Intl. Conf. on Aud. Disp,* 151-156.

Yeh, H., Mehra, R., Ren, Z., Antani, L., Manocha, D., and Lin, M. 2013. Wave-ray coupling for interactive sound propagation in large complex scenes. *ACM Trans. Graph.* 32, 6, 165:1-165:11.

Yoon, S., Gobbetti, E., Kasik, D., and Manocha, D. 2008. Real-Time Massive Model Rendering. Morgan and Claypool Publishers.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for conducting interactive sound propagation and rendering for a plurality of sound sources in a virtual environment scene, the method comprising:
    decomposing a virtual environment scene containing a plurality of sound sources into a plurality of partitions;
    forming a plurality of source group clusters, wherein each of the source group clusters includes two or more of the sound sources located within a common partition;
    determining, for each of the source group clusters, a single set of sound propagation paths relative to a listener position;
    generating a simulated output sound at a listener position using sound intensities associated with the determined sets of sound propagation paths, wherein generating a simulated output sound includes sorting each of the sound propagation paths based on an amount of Doppler shifting exhibited by the sound propagation path; and
    rendering a sound intensity using fractional delay line interpolation on a first group of the sound propagation paths that exhibits an amount of Doppler shifting that exceeds a predefined threshold.

2. A method for conducting interactive sound propagation and rendering for a plurality of sound sources in a virtual environment scene, the method comprising:
    decomposing a virtual environment scene containing a plurality of sound sources into a plurality of partitions;
    forming a plurality of source group clusters, wherein each of the source group clusters includes two or more of the sound sources located within a common partition;
    determining, for each of the source group clusters, a single set of sound propagation paths relative to a listener position;
    generating a simulated output sound at a listener position using sound intensities associated with the determined sets of sound propagation paths, wherein generating a simulated output sound includes sorting each of the sound propagation paths based on an amount of Doppler shifting exhibited by the sound propagation path; and
    rendering a sound intensity using a partitioned block convolution algorithm on a second group of the sound propagation paths that exhibits an amount of Doppler shifting that fails to exceed a predefined threshold.

3. The method of claim 1 wherein the sound sources are formed into source group clusters based on a location relative to the listener position.

4. The method of claim 1 wherein the simulated output sound includes specular and diffuse reflections that are determined by tracing rays backwards from the listener position to at least one of the sound sources.

5. The method of claim 1 wherein forming the plurality of source group clusters includes merging two or more source group clusters into a single merged source group cluster.

6. A system for conducting interactive sound propagation and rendering for a plurality of sound sources in a virtual environment scene, the system comprising:
    a processor;
    a scene decomposition module (SDM) executable by the processor, the SDM is configured to decompose a virtual environment scene containing a plurality of sound sources into a plurality of partitions;
    a sound source clustering (SSC) module executable by the processor, the SSC module is configured to:
        form a plurality of source group clusters, wherein each of the source group clusters includes two or more of the sound sources located within a common partition; and
        determine, for each of the source group clusters, a single set of sound propagation paths relative to a listener position; and
    a hybrid convolution audio rendering (HCAR) module executable by the processor, the HCAR module is configured to:
        generate a simulated output sound at a listener position using sound intensities associated with the determined sets of sound propagation paths by sorting each of the sound propagation paths based on an amount of Doppler shifting exhibited by the sound propagation path, and
        render a sound intensity using fractional delay line interpolation on a first group of the sound propagation paths that exhibits an amount of Doppler shifting that exceeds a predefined threshold.

7. A system for conducting interactive sound propagation and rendering for a plurality of sound sources in a virtual environment scene, the system comprising:
- a processor;
- a scene decomposition module (SDM) executable by the processor, the SDM is configured to decompose a virtual environment scene containing a plurality of sound sources into a plurality of partitions;
- a sound source clustering (SSC) module executable by the processor, the SSC module is configured to:
  - form a plurality of source group clusters, wherein each of the source group clusters includes two or more of the sound sources located within a common partition; and
  - determine, for each of the source group clusters, a single set of sound propagation paths relative to a listener position; and
- a hybrid convolution audio rendering (HCAR) module executable by the processor, the HCAR module is configured to:
  - generate a simulated output sound at a listener position using sound intensities associated with the determined sets of sound propagation paths by sorting each of the sound propagation paths based on an amount of Doppler shifting exhibited by the sound propagation path; and
  - render a sound intensity using a partitioned block convolution algorithm on a second group of the sound propagation paths that exhibits an amount of Doppler shifting that fails to exceed a predefined threshold.

8. The system of claim 6 wherein the sound sources are formed into source group clusters based on a location relative to the listener position.

9. The system of claim 6 wherein the simulated output sound includes specular and diffuse reflections that are determined by tracing rays backwards from the listener position to at least one of the sound sources.

10. The system of claim 6 wherein the SSC module is further configured to merging two or more source group clusters into a single merged source group cluster.

11. A non-transitory computer readable medium having stored thereon executable instructions that when executed by a processor of a computer cause the computer to perform steps comprising:
- decomposing a virtual environment scene containing a plurality of sound sources into a plurality of partitions;
- forming a plurality of source group clusters, wherein each of the source group clusters includes two or more of the sound sources located within a common partition;
- determining, for each of the source group clusters, a single set of sound propagation paths relative to a listener position;
- generating a simulated output sound at a listener position using sound intensities associated with the determined sets of sound propagation paths, wherein generating a simulated output sound includes sorting each of the sound propagation paths based on an amount of Doppler shifting exhibited by the sound propagation path; and
- rendering a sound intensity using fractional delay line interpolation on a first group of the sound propagation paths that exhibits an amount of Doppler shifting that exceeds a predefined threshold.

12. A non-transitory computer readable medium having stored thereon executable instructions that when executed by a processor of a computer cause the computer to perform steps comprising:
- decomposing a virtual environment scene containing a plurality of sound sources into a plurality of partitions;
- forming a plurality of source group clusters, wherein each of the source group clusters includes two or more of the sound sources located within a common partition;
- determining, for each of the source group clusters, a single set of sound propagation paths relative to a listener position;
- generating a simulated output sound at a listener position using sound intensities associated with the determined sets of sound propagation paths, wherein generating a simulated output sound includes sorting each of the sound propagation paths based on an amount of Doppler shifting exhibited by the sound propagation path; and
- rendering a sound intensity using a partitioned block convolution algorithm on a second group of the sound propagation paths that exhibits an amount of Doppler shifting that fails to exceed a predefined threshold.

13. The non-transitory computer readable medium of claim 11 wherein the sound sources are formed into source group clusters based on a location relative to the listener position.

14. The non-transitory computer readable medium of claim 11 wherein the simulated output sound includes specular and diffuse reflections that are determined by tracing rays backwards from the listener position to at least one of the sound sources.

* * * * *